United States Patent
Fay et al.

(10) Patent No.: US 9,599,534 B2
(45) Date of Patent: Mar. 21, 2017

(54) OPTICAL EVALUATION OF LENSES AND LENS MOLDS

(71) Applicant: Zygo Corporation, Middlefield, CT (US)

(72) Inventors: Martin F. Fay, Middletown, CT (US); Xavier Colonna de Lega, Middlefield, CT (US); Peter J. de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 14/825,317

(22) Filed: Aug. 13, 2015

(65) Prior Publication Data
US 2016/0047711 A1 Feb. 18, 2016

Related U.S. Application Data

(60) Provisional application No. 62/037,966, filed on Aug. 15, 2014, provisional application No. 62/039,398, filed on Aug. 19, 2014.

(51) Int. Cl.
*G01B 9/00* (2006.01)
*G01M 11/02* (2006.01)

(52) U.S. Cl.
CPC ...... *G01M 11/0271* (2013.01); *G01M 11/025* (2013.01)

(58) Field of Classification Search
CPC .................................................... G01B 9/00
USPC ......................................................... 356/124
See application file for complete search history.

(56) References Cited

U.S. PATENT DOCUMENTS

| | | | |
|---|---|---|---|
| 3,861,808 A * | 1/1975 | Halsey | G01B 11/255 250/237 G |
| 7,324,210 B2 | 1/2008 | de Groot et al. | |
| 8,649,024 B2 | 2/2014 | Colonna de Lega | |
| 2001/0035953 A1 | 11/2001 | Morita et al. | |
| 2003/0090798 A1 | 5/2003 | Evans et al. | |
| 2004/0252310 A1 | 12/2004 | De Lega et al. | |
| 2005/0083537 A1 | 4/2005 | Kuchel | |
| 2007/0008551 A1 | 1/2007 | Tang | |
| 2007/0091317 A1 | 4/2007 | Freischlad et al. | |

(Continued)

FOREIGN PATENT DOCUMENTS

| TW | 201333579 | 8/2013 |
|---|---|---|
| WO | WO 2014/072818 | 5/2014 |

OTHER PUBLICATIONS

R. Artigas, "Imaging Confocal Microscopy," in Optical Measurement of Surface Topography, edited by R. Leach, chapt. 11, pp. 237-286, (Springer Berlin Heidelberg, 2011).

(Continued)

*Primary Examiner* — Roy M Punnoose
(74) *Attorney, Agent, or Firm* — Fish & Richardson P.C.

(57) ABSTRACT

A method for determining information about an object including a curved portion and a planar portion, the curved portion having a first curved surface having an apex and defining an axis of the object, includes: directing measurement light to the object; detecting measurement light reflected from the first curved surface of the curved portion; detecting measurement light reflected from at least one other surface of the object; and determining, based on the detected light, information about the apex of the first curved surface of the curved portion.

23 Claims, 16 Drawing Sheets

(56) References Cited

U.S. PATENT DOCUMENTS

| | | |
|---|---|---|
| 2007/0139640 A1 | 6/2007 | Biel et al. |
| 2008/0093759 A1 | 4/2008 | Shyu et al. |
| 2010/0231923 A1* | 9/2010 | Ge .................... G01B 11/2441 356/511 |
| 2012/0320374 A1 | 12/2012 | Sites et al. |
| 2013/0027692 A1 | 1/2013 | Ogura et al. |
| 2014/0009765 A1 | 1/2014 | Sugimoto |

OTHER PUBLICATIONS

Colonna de Lega, et al., "Interference Microscopy for Semiconductor Back End Patterning Metrology" *Frontiers of Characterization and Metrology for Nanoelectronics*, CP1173, pp. 359-363 (2009).

de Groot, et al., "Optical Interferometry for Measurement of the Geometric Dimensions of Industrial Parts" Applied Optics, vol. 41, No. 19, pp. 3853-3860 (Jul. 2002).

de Groot et al., "Transparent film profiling and analysis by interference microscopy" Proc. of SPIE, vol. 7064, pp. 706401-1 706401-6 (2008).

P. de Groot, "Coherence Scanning Interferometry" in Optical Measurement of Surface Topography, edited by R. Leach, chapt.9, pp. 187-208, (Springer Verlag, Berlin, 2011).

Deck, "Fourier-Transform Phase-Shifting Interferometry" Applied Optics, vol. 42, No. 13, pp. 2354-2365 (May 2003).

M. Haruna, et al., "Simultaneous measurement of the phase and group indices and the thickness of transparent plates by low-coherence interferometry," Optics Letters, vol. 23, No. 12, pp. 966-968 (Jun. 15, 1998).

F. Helmli, "Focus Variation Instruments," in Optical Measurement of Surface Topography, edited by R. Leach, Chapt. 7, pp. 131-166, (Springer Berlin Heidelberg, 2011).

Y. Kim, et al., "Measurement of the surface shape and optical thickness variation of a polishing crystal wafer by wavelength tuning interferometer," Proc. of SPIE, vol. 9132, pp. 91320V-1-91320V-8 (2014).

H. Maruyama, et al., "Low-Coherence Interferometer System for the Simultaneous Measurement of Refractive Index and Thickness," Applied Optics, vol. 41, No. 7, pp. 1315-1322 (Mar. 2002).

D. F. Murphy et al., "Dispersion-insensitive measurement of thickness and group refractive index by low-coherence interferometry," Applied Optics, vol. 39, No. 25, pp. 4607-4615 (Sep. 2000).

J. Roth et al., "Wide-field scanning white light interferometry of rough surfaces," Proc. ASPE Spring Topical Meeting on Advances in Surface Metrology, pp. 57-60 (1997).

P. Scott, "Recent Developments in the Measurement of Aspheric Surfaces by Contact Stylus Instrumentation," Proceedings of SPIE, Fol. 4927, pp. 199-207 (2002).

Watanabe, et al., "Simultaneous measurement of refractive index and thickness distributions using low-coherence digital holography and vertical scanning," Journal of Optics vol. 16, No. 4, pp. 1-8 (2014).

Wu, et al., "High-accuracy thickness measurement of a transparent plate with the heterodyne central fringe identification technique," Applied Optics, vol. 50, No. 21, pp. 4011-4016 (Jul. 2011).

Office Action for U.S. Appl. No. 14/825,355 dated Sep. 27, 2016.

International Search Report and Written Opinion of the International Searching Authority for International Application No. PCT/US2015/045149 dated Nov. 30, 2015 (10 pages).

* cited by examiner

OPTICAL EVALUATION OF LENSES AND LENS MOLDS

CROSS-REFERENCE TO RELATED APPLICATIONS

This application claims priority to Provisional Application No. 62/037,966, entitled "OPTICAL EVALUATION OF THE DIMENSIONAL AND OPTICAL PROPERTIES OF LENSES HAVING MECHANICAL LOCATING FEATURES," filed on Aug. 15, 2014 and to Provisional Application No. 62/039,398, entitled "OPTICAL EVALUATION OF FEATURE LOCATIONS ON LENSES," filed on Aug. 19, 2014. The contents of both provisional applications is hereby incorporated by reference in its entirety.

FIELD OF THE DISCLOSURE

In certain aspects, this disclosure relates to methods and tools for characterizing the geometry and optical properties of molded lenses used in consumer products, as well as the diamond turned molds used for their fabrication. This disclosure further relates to fabrication of optical assemblies containing such molded lenses, and fabrication of consumer products containing the optical assemblies.

BACKGROUND

The market for miniaturized cameras used in smartphones and cellphones, tablets, portable computers, cars and trucks is rapidly expanding. Image quality requirements for state-of-the-art cameras force manufacturers to develop complex optical assemblies composed of many aspherical molded lenses.

FIG. 1 shows an exemplary optical assembly composed of four molded plastic lenses. In particular, this assembly, which is described in U.S. Pat. No. 7,777,972, includes four lenses arranged to form an image on a sensor located at an image plane 170 of the assembly. The lens elements are arranged in a first lens group composed of a first lens element 100 with positive refractive power having an aspheric convex object-side surface 101 and an aspheric convex image-side surface 102. The assembly also includes a second lens group composed of a second lens element 110, a third lens element 120, and a fourth lens element 130.

The second lens element 110 has negative refractive power having an aspheric convex object-side surface 111 and an aspheric concave image-side surface 112. The third lens element 120 has an aspheric concave object-side surface 121 and an aspheric convex image-side surface 122. The fourth lens element 130 has an aspheric convex object-side surface 131 and an aspheric concave image-side surface 132. An aperture stop 140 is positioned between the first lens element 100 and the imaged object. An IR filter 150 is disposed between the image-side surface 132 of the fourth lens element 130 and the image plane 170, the IR filter 150 having no influence on the focal length of the imaging optical lens assembly. A sensor cover glass 160 is arranged between the IR filter 150 and the image plane 170, the sensor cover glass 160 also having no influence on the focal length of the imaging optical lens assembly.

In general, the curved lens surfaces are rotationally symmetrical about an axis, and each surface's axis nominally lies on a common axis—the optical axis—of the assembly. Common centration of the lens surface axes is important for the optical performance of the overall assembly. Also important is the curvature of each lens surface and the spacing between each lens surface—i.e., both the lens thickness and the spacing between adjacent lenses.

Accordingly, each individual lens typically includes multiple centration and spacing datums, manufactured with tight enough tolerances to provide proper alignment of the final lens assembly when stacked together in addition to the curved functional optical surfaces depicted in FIG. 1. These datums are commonly provided by additional non-optically active portions of each lens, which form a ring around the edge of the active lens portions. When assembled, the non-optical portions of the lenses stack together, aligning and spacing the lens portions relative to each other as required by the overall lens assembly design.

Because of tightening manufacturing tolerance budgets, conventional metrology equipment (e.g., contact probes and gages, tactile profilers, inspection microscopes) is in many cases no longer capable of achieving required measurement reproducibility or accuracy. Additionally, metrology equipment for measuring certain properties of the lenses, such as refractive index or birefringence, on the production floor, is not commercially available. Accordingly, a metrology gap exists today.

SUMMARY

The disclosure features methods and apparatus for evaluating the dimensional and optical properties of transparent samples, including in particular, lenses including active surface areas that are curved, and also including upper and lower surface areas that are nominally flat and parallel, for example for mechanically locating these lenses in an assembly.

In embodiments, the apparatus includes an optical metrology system for measuring the relative location of the nominally parallel upper and lower surface areas of the sample, and a data processing system for evaluating the optical and dimensional properties of the sample using the information derived from the calculated optical and physical thickness at two or more positions of the nominally parallel upper and lower surface areas of the sample.

Alternatively, or in addition, the disclosure features methods and apparatus for evaluating the dimensional properties of a transparent sample (e.g., a lens) by combining 3D surface topography information (e.g., a height profile) with 2D images (e.g., an intensity profile) for both the upper and lower surfaces of the sample. The topography information and the two images may be acquired from the same side of the sample.

The methods and apparatus may be used in a production environment.

In general, the sample may be a lens that includes upper and lower active surface areas that are curved (e.g., having optical power), as well as additional upper and lower surface areas that are not used for directing light, but rather for mechanically locating these lenses in an assembly. These portions may have plane parallel surfaces. The curved portions may be referred to as active portions and the other (e.g., plane parallel) portions as inactive portions. The sample may have surface areas of the active portions that are convex or concave, spherical or aspheric.

The upper and lower surfaces of the inactive portions may be nominally flat or conical, and may include nominally circular features or boundaries which may be nominally concentric with the apex of the active surface area.

The sample may be a lens for use in a portable electronic device camera assembly.

In general, the dimensional properties may include the location of the apex of an active surface area with respect to a datum feature (e.g., a nominally circular datum feature) of an additional surface area. In some embodiments, the lens apex is found by evaluation of a 3D areal surface topography map, whereas the datum feature is located in a 2D image of the part. The 2D image may be extracted from the same data acquisition as the 3D map, or may be part of a separate step.

The dimensional properties may include the relative height of upper and lower apex features of the sample. This measurement may rely on additional information derived from the calculated optical and physical thickness at two or more positions of the nominally parallel upper and lower surface areas of the sample.

In certain embodiments, the methodology includes compensation for the refractive properties of the lens when viewing features through the sample to determine their lateral position.

In some embodiments, the apparatus includes a part fixture that includes an auxiliary reference surface. This auxiliary reference surface may be nominally flat, and may be located at a distance under the optical component under test in such a way that it reflects light that propagated through the optical component back through the component and toward the metrology-device detector channel.

In some embodiments, the apparatus includes a part fixture that has both the auxiliary reference surface and a holder for the at least partially-transparent sample, an optical metrology system for measuring the location of the auxiliary reference surface as well as the nominally parallel upper and lower surface areas of the sample, and a data processing system for evaluating the optical and dimensional properties of the sample using the information derived from the calculated optical and physical thickness at two or more positions of the nominally parallel upper and lower surface areas of the sample.

In some embodiments, a complete measurement cycle includes a separate measurement of the topography of the auxiliary reference surface.

In some embodiments, the apparatus includes element(s) to alter the polarization state of the light employed by the optical metrology system (e.g., a polarizer and/or wave plate), so as to evaluate and/or compensate for material birefringence properties of the sample.

In some embodiments, the field of view of the optical metrology device extends beyond the lateral extent of the optical component under test. For improved accuracy and reduced sensitivity to drift, the system performs an additional measurement of the location of the reference surface with respect to its internal datum, in areas where the reference surface is not covered by the optical component.

In some embodiments, the optical metrology device is a coherence scanning interferometer. For example, the optical metrology device can be a coherence scanning interferometer that is scanned nominally parallel to an optical axis of the optical component under test. The coherence properties of the light source may be chosen to enhance (e.g., maximize) the signal to noise ratio of the interference signal collected for each transparent interface encountered during scan through the component.

In some embodiments, the coherence scanning interferometer automatically adjusts the light source coherence properties to enhance (e.g., maximize) signal to noise ratio according to measured or nominal information about the part thickness and optical properties.

In some embodiments, measurements performed with the sample at multiple azimuthal orientations with respect to the instrument are combined to produce a final result with reduced systematic error.

In some embodiments, a confocal microscope configuration is used for detecting the location of the transparent interfaces of the sample by scanning.

In certain embodiments, a focus sensing or structured illumination metrology device is used for detecting the location of the transparent interfaces of the sample by scanning.

In certain embodiments, a focus-sensing or structured-illumination metrology device is used for detecting the location of the transparent interfaces by scanning.

In some embodiments, the optical radiation used for the metrology is chosen in the ultraviolet, visible or infrared spectra. Measurements are preferably performed within a spectral domain close to that for which the optical component is designed.

In certain implementations, the apparatus and method may be used to characterize the thickness and refractive index of molded lenses. Alternatively, or in addition, the methods and apparatus may be used to characterize the thickness and lateral distances between features of molded lenses (e.g., critical features).

In general, typical lens molding processes rely on the accurate alignment of two molds facing one another. The distance between the molds defines the thickness of the molded components. Lens thickness is a critical parameter for the performance of the final lens assembly. The disclosed methods and apparatus can provide process control information for apex-to-apex thickness, e.g., with sub-micrometer accuracy.

Thickness variations across a lens provide quantitative information about the relative tilt of the two halves of the lens, another parameter that is often critical for the final lens imaging capability. The tilt or parallelism error is thus another process control parameter that may be measured by the disclosed apparatus and methods.

The refractive index and its variations within the lens also provide relevant information for process control. Out-of-tolerance refractive index variations or stress birefringence indicate problems with the injection molding process. Both parameters affect the imaging performance of the optical component. Both parameters may be quantitatively assessed with the disclosed apparatus and method for process control.

The lateral centering between the molds defines the apex-to-apex centering of the lens, another critical parameter for the final lens capability. The disclosed methods and apparatus can provide process control information for apex-to-apex centering, e.g., with sub-tenth-micrometer precision.

Molding process parameters also influence the fill factor within the mold and hence apex height and centering relative to locating features. Out-of-tolerance apex-to-feature height and apex-to-feature centering can indicate problems with the injection molding process. Both parameters affect the imaging performance of the optical component. Both parameters are quantitatively assessed with the disclosed methods and apparatus for process control.

Various aspects of the invention are summarized as follows.

In general, in a first aspect, the invention features a method for determining information about a transparent optical element composed of an active portion (e.g., a lens portion) and an inactive portion (e.g., a plane parallel portion), the active portion including at least one curved surface and the inactive portion including opposing first and second surfaces, the method including: directing measurement light to the transparent optical element; detecting measurement light reflected from at least one location on the first surface of the inactive portion; detecting measurement light reflected from the second surface of the inactive portion at a location corresponding to the at least one location on the first surface; determining, based on the detected light, information about the inactive portion; and evaluating the transparent optical element based on the information about the inactive portion.

Implementations of the method may include one or more of the following features and/or features of other aspects. For example, the surface measurements of the first and second surfaces of the inactive portion can be performed using coherence scanning interferometry (CSI). Alternatively, the surface measurements of the first and second surfaces of the inactive portion are performed using confocal microscopy.

The information about the inactive portion can include a height profile of the first surface of the inactive portion and a height profile of the second surface of the inactive portion. The information about the inactive portion can include a physical thickness profile or optical thickness profile of the inactive portion.

The information about the inactive portion can include information about a refractive index of a material forming the transparent optical element. For example, the information about the refractive index can include a group index of the material and/or a phase index of the material. The information about the refractive index can include information about variations of a refractive index between different locations of the inactive portion. The information about the refractive index can include information about birefringence of the material forming the transparent optical element (e.g., plastic).

In some embodiments, the method further includes detecting measurement light reflected from a reference feature on a fixture that supports the transparent optical element and determining, based on the detected light from the reference feature information about the reference feature. The measurement light reflected from the reference feature may be reflected from a location corresponding to the at least one location on the first surface of the inactive portion (e.g., imaged to the same location of the detector). The measurement light can be transmitted by the transparent optical element before and after being reflected from the reference feature. In some embodiments, the transparent optical element is not in the path of the measurement light reflected from the reference feature. In some cases, the method can include detecting measurement light reflected from the fixture at a second location different from location corresponding to the at least one location of the first surface of the inactive portion.

The measurement light can be detected for a first polarization and, thereafter, a second polarization different from the first polarization.

Evaluating the transparent optical element can include inferring information about a dimensional or optical property of the active portion based on the information about the inactive portion.

In some embodiments, the inactive portion is a tilt control interlock of the transparent optical element. The at least one curved surface of the active portion can be a spherical surface or an aspheric surface. The active portion can include a second curved surface opposite the first curved surface.

The information about the active portion can include information about birefringence of a material forming the lens portion. The information about the active portion can include information about variations of a refractive index of a material forming the lens portion.

Evaluating the transparent optical element can include determining whether the transparent optical element meets a specification requirement based on the information about the inactive portion. The inactive portion can be located around a circumference of the active portion.

In a further aspect, the invention features a method of forming an optical assembly, including: determining information about the transparent optical element using the foregoing method, where the transparent optical element is a lens; and securing the lens relative to one or more other lenses in a barrel to form the optical assembly. The method can include securing the optical assembly relative to a sensor to provide a module for a digital camera.

In general, in another aspect, the invention features a system for determining information about a transparent optical element that includes an active portion (e.g., a lens portion) and an inactive portion (e.g., plane parallel portion), the active portion including at least one curved surface and the inactive portion including opposing first and second surfaces, the system including: a fixture for supporting the transparent optical element; an optical instrument including a light source, a detector, and optical elements arranged to direct light from the light source towards the transparent optical element when the transparent optical element is supported by the fixture and direct light reflected from the transparent optical element to the detector; and an electronic controller in communication with the detector, the electronic controller being programmed to determine information about the inactive portion based on light detected from corresponding locations of the first and second surfaces of the inactive portion.

Embodiments of the system can include one or more of the following features and/or features of other aspects. For example, the optical instrument can be an optical areal surface topography instrument, such as a coherence scanning interferometer or a confocal microscope.

The fixture can include a reference feature located in a path of the light from the optical instrument. In some embodiments, the reference feature is a planar reflector. The fixture can include a stand which positions the transparent optical element a distance from the reference feature. The fixture may include an actuator for rotating the transparent optical element relative to an optical axis of the optical instrument.

The light source may be capable of providing light having variable spectral content.

The optical instrument can include a polarization module configured to polarize light from the light source. The polarization module may be configured to selectively polarize light from the light source in orthogonal polarization states.

In general, in a further aspect, the invention features a method for determining information about a transparent optical element having a lens portion and a plane parallel portion, the method including: using an optical instrument to obtain height information (e.g., a surface profile) about a first surface of the transparent optical element and a second surface of the transparent optical element opposite the first surface; using the optical instrument to obtain an intensity map (e.g., an image) of the first surface and an intensity map of the second surface; and determining, based on the height information and the intensity maps, dimensional information about one or more features of the transparent optical element on at least one of the first surface and the second surface.

Implementations of the method may include one or more of the following features and/or features of other aspects. For example, the optical instrument can be a coherence scanning interference microscope or a confocal microscope.

The height information about the first and second surfaces can include surface profiles of the first and second surfaces, respectively. The method of claim 1, wherein the intensity map is determined based on a sequence of intensity frames collected using a multi-element detector of the optical instrument. The intensity map is determined by averaging the intensity at each element of the multi-element detector for the sequence of intensity frames. Using the optical instrument to obtain the intensity maps can include determining an intensity for each element of the multi-element detector at respective positions of best focus for the first and second surfaces relative to the optical instrument.

The dimensional information may include the location of an apex of the first or second surface relative to another feature on the first or second surface. In some cases, the dimensional information is a lateral distance between the apex and the other feature, the lateral distance being a distance measured in a plane nominally parallel to the plane parallel portion. The other feature can be a feature located at the plane parallel portion of the first or second surface. The other feature can be an annular feature, nominally centered on the apex. The other feature can be a step in the first and/or second surface of the plane parallel portion.

The optical instrument may be used to perform a measurement of the transparent optical object with the first surface facing the optical instrument and to perform a measurement of the transparent optical object with the second surface facing the optical instrument. Data acquired from the measurement of the transparent optical object with the first surface facing the optical instrument may be used to determine a location of an apex of the lens portion of the first surface. Data acquired from the measurement of the transparent optical object with the first surface facing the optical instrument may be used to determine the location of the apex of the lens portion of the first surface relative to a location of a feature on the plane parallel portion of the first surface. Data acquired from the measurement of the transparent optical object with the first surface facing the optical instrument may be used to determine a location of a feature on the plane parallel portion of the first surface relative to a location of a feature on the plane parallel portion of the second surface. Data acquired from the measurement of the transparent optical object with the second surface facing the optical instrument may be used to determine a location of an apex on the lens portion of the second surface relative to the location of the apex on the first surface.

Determining the dimensional information can include accounting for an effect of refraction due to a tilt of the transparent optical element relative to the optical instrument. The dimensional information for which the effect of refraction is accounted can be a location of a feature on the surface of the transparent optical element opposite the optical instrument.

The optical instrument can be used to perform a measurement of the transparent optical object with a first azimuthal orientation relative to an axis of the optical instrument and to perform a measurement of the transparent optical object with the second azimuthal orientation relative to the axis different from the first azimuthal orientation. Determining the dimensional information can include determining dimensional information about the one or more features from data obtained from the measurement with the transparent optical element with the first azimuthal orientation and determining dimensional information about the one or more features from data obtained from the measurement with the transparent optical element with the second azimuthal orientation. Determining the dimensional information can include reducing error in the dimensional information based on the dimensional information obtained for the first and second azimuthal orientations.

The method can include determining whether the transparent optical element meets a specification requirement based on the dimensional information.

In another aspect, the invention features a system for determining information about a transparent optical element, including: an optical instrument, and an electronic controller in communication with the optical instrument and programmed to cause the system to perform the method of the prior aspect.

Embodiments of the system may include one or more features of other aspects.

In general, in another aspect, the invention features a method for determining information about an object including a curved portion and a planar portion, the curved portion including a first curved surface having an apex and defining an axis of the object, the method including: directing measurement light to the object; detecting measurement light reflected from the first curved surface of the curved portion; detecting measurement light reflected from at least one other surface of the object; and determining, based on the detected light, information about the apex of the first curved surface of the curved portion.

Implementations of the method may include one or more of the following features and/or features of other aspects. For example, the object can be a transparent optical element, such as a lens element (e.g., a molded lens element). In some embodiments, the object is portion of a mold for an optical element, such as a mold for one side of a lens element.

The curved portion can include a second curved surface opposite the first curved surface, the second curved surface having an apex, and the information about the apex of the first curved surface includes a thickness of the lens between the apex of the first surface and the apex of the second surface measured along the optical axis.

The curved portion can include a second curved surface opposite the first curved surface, the second curved surface having an apex, and the information about the apex of the first curved surface includes a lateral offset between the apex of the first surface and the apex of the second surface measured in a plane orthogonal to the optical axis.

The measurement light can be directed to the object by an optical instrument and the first curved surface faces the optical instrument when reflecting the measurement light. Determining the information about the apex of the first curved surface can include determining a location of the apex. The at least one other surface can include another surface facing the optical instrument and determining the information about the apex of the first curved surface further can include determining a lateral offset measured in a plane orthogonal to the optical axis between the apex and a feature of interest on the at least one other surface. The at least one other surface can include a surface facing away from the optical instrument and determining the information about the apex of the first curved surface further can include determining a lateral offset measured in a plane orthogonal to the optical axis between a feature on the surface facing away from the optical instrument and the feature of interest on the other surface facing the optical instrument. The curved portion can include a second curved surface opposite the first curved surface and determining the information about the apex of the first curved surface includes determining a location of the apex of the second curved surface. Determining the information about the apex of the first curved surface can include determining a thickness of the curved portion measured along the optical axis based on the locations of the first and second curved surfaces apexes. In some embodiments, determining the information about the apex of the first curved surface includes determining a lateral offset between the apex of the first surface and the apex of the second surface measured in a plane orthogonal to the optical axis based on: (i) the lateral offset between the apex of the first curved surface and the feature of interest on the other surface facing the optical instrument; (ii) the lateral offset between the feature of interest on the other surface facing the optical instrument and the feature of interest on the surface facing away from the optical instrument; and (iii) the lateral offset between the apex of the second curved surface and the feature of interest on the surface facing away from the optical instrument.

Determining information about the apex of the first curved surface can include determining information about a tilt of at least one surface of the planar portion and accounting for the tilt when determining the information about the apex of the first surface. The information about the tilt is a tilt angle, $\alpha_{tilt}$, relative to an optical axis of an optical instrument used to direct the measurement light to the object.

The method may include adjusting an azimuthal orientation of the object with respect to an optical instrument used to direct the measurement light to the object after detecting the measurement light, and repeating the detection of measurement light from the first curved surface and from the at least one other surface after the azimuthal orientation adjustment. The method may include determining additional information about the apex of the first curved surface based on the detected measurement light after the azimuthal orientation adjustment.

In some embodiments, the method includes changing a polarization state of the measurement light after detecting the measurement light, and repeating the detection of measurement light from the first curved surface and from the at least one other surface after the polarization state change. The method can include determining information about a birefringence of the object based on the detected measurement light before and after the polarization state change.

The method may include evaluating the object based on the information about the apex of the first curved surface. Evaluating the object can include determining whether the object meets a specification requirement based on the information about the apex of the first curved surface.

The planar portion can be a tilt control interlock of the object. The at least one curved surface of the curved portion can be an aspheric surface. The planar portion can be located around a circumference of the curved portion.

In a further aspect, the invention features a method of forming an optical assembly, including: determining information about the object using the foregoing method where the object is a lens; and securing the lens relative to one or more other lenses in a barrel to form the optical assembly. The method may include securing the optical assembly relative to a sensor to provide a module for a digital camera.

In a further aspect, the invention features a system for determining information about an object including a curved portion and a planar portion, the curved portion having a first curved surface having an apex and defining an axis of the object, the system including: a fixture for supporting the object; an optical instrument including a light source, a detector, and optical elements arranged to direct light from the light source towards the object when the object is supported by the fixture and direct light reflected from the object to the detector; and an electronic controller in communication with the detector, the electronic controller being programmed to determine information about the apex of the first surface based on light detected from the first curved surface and from at least one other surface of the object.

Embodiments of the system may include one or more of the following features and/or features of other aspects. For example, the optical instrument can be an optical areal surface topography instrument, such as a coherence scanning interferometer or a confocal microscope.

The fixture can include an actuator configured to reorient the object with respect to the optical instrument. For example, the actuator can be configured to rotate the object relative to an optical axis of the optical instrument.

The optical instrument can include a polarization module configured to polarize light from the light source. The polarization module can be configured to selectively polarize light from the light source in orthogonal polarization states (e.g., using one or more polarizers and/or waveplates).

The detector can be a multi-element detector (e.g., a CMOS array or a CCD array) and the optical instrument can be configured to image a surface of the object onto the multi-element detector.

The light source can be capable of varying its spectral output. For example, the light source can include two or more LEDs of differing color. Varying the relative light intensity from the two or more LEDs varies the color of the light. The light source can be a visible and/or infrared light source.

Other aspects and advantages of the invention will be apparent from the description below.

DETAILED DESCRIPTION

Figure 2A:
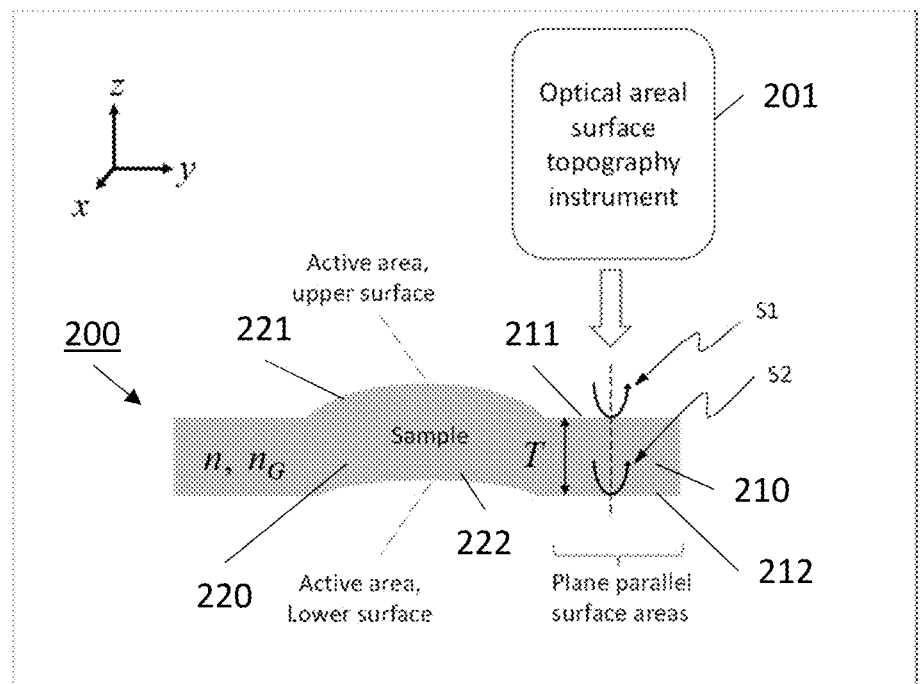
FIG. 2A is a side view of a sample lens under test.
Figure 2B:
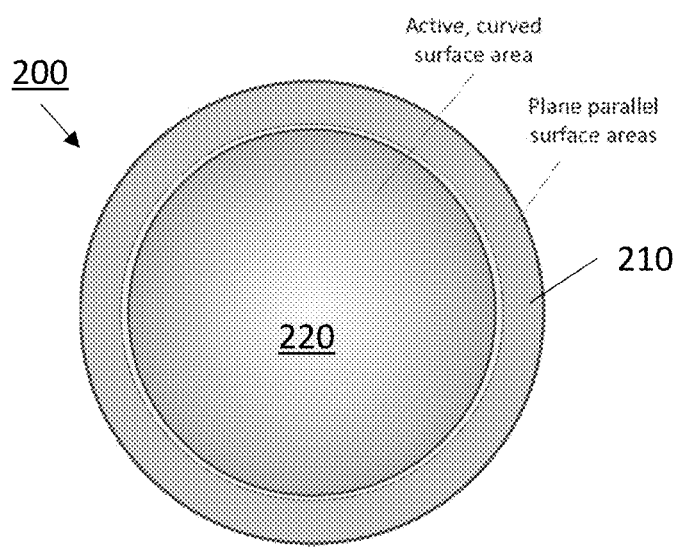
FIG. 2B is a top view of the sample lens under test shown in FIG. 2A.

Referring to FIGS. 2A and 2B, a lens 200 that includes an inactive, plane parallel portion 210 and an active, lens portion 220. In this instance, plane parallel portion includes two nominally planar, nominally parallel surfaces 211 and 212. Here, "nominal" refers to the design of the lens. Detectable deviations from nominal planarity or nominal parallelism may occur, e.g., due to manufacturing errors. Lens portion 220 is a meniscus lens, having a convex upper surface 221 and a concave lower surface 222. In general, surfaces 221 and 222 may be spherical or aspherical. The plane parallel surfaces 211 and 212 may, for example, be features formed on the sample to aid in the alignment and fixturing of the lens relative to one or more other lenses in a final assembly.

An optical metrology instrument 201 is used to evaluate some of the optical properties of the lens 200, including in particular the refractive index uniformity and residual stress birefringence, as well as dimensional features such as the thickness of the lens, including but not limited to the thickness, T, in the figure as a function of the coordinates x, y (see the Cartesian coordinate system shown in FIG. 2A). The disclosed method performs these evaluations by measuring the optical properties and physical dimensions of the area between the plane parallel surface surfaces 211 and 212. These measurements serve as indicators of the overall optical and dimensional properties of the lens.

In general, optical metrology instrument 201 can be one of a variety of different instruments capable of performing an areal surface topography measurement of lens 200. Example instruments include coherence scanning interferometry (CSI) microscopes (such as disclosed, e.g., in P. de Groot, "Coherence Scanning Interferometry," in Optical Measurement of Surface Topography, edited by R. Leach, chapt. 9, pp. 187-208, (Springer Verlag, Berlin, 2011)), imaging confocal microscopes (such as disclosed, e.g., in R. Artigas, "Imaging Confocal Microscopy," in Optical Measurement of Surface Topography, edited by R. Leach, chapt. 11, pp. 237-286, (Springer Berlin Heidelberg, 2011)), structured illumination microscopes (such as disclosed, e.g., in X. M. Colonna de Lega "Non-contact surface characterization using modulated illumination", U.S. Pat. No. 8,649,027 (2014).), focus sensing (such as disclosed, e.g., in F. Helmli, "Focus Variation Instruments," in Optical Measurement of Surface Topography, edited by R. Leach, chapt. 7, pp. 131-166, (Springer Berlin Heidelberg, 2011)) or wavelength tuned Fourier transform phase shifting interferometry (FTPSI) systems (such as disclosed, e.g., in L. L. Deck, "Fourier-Transform Phase-Shifting Interferometry," Applied Optics 42 (13), 2354-2365 (2003)).

Figure 3:
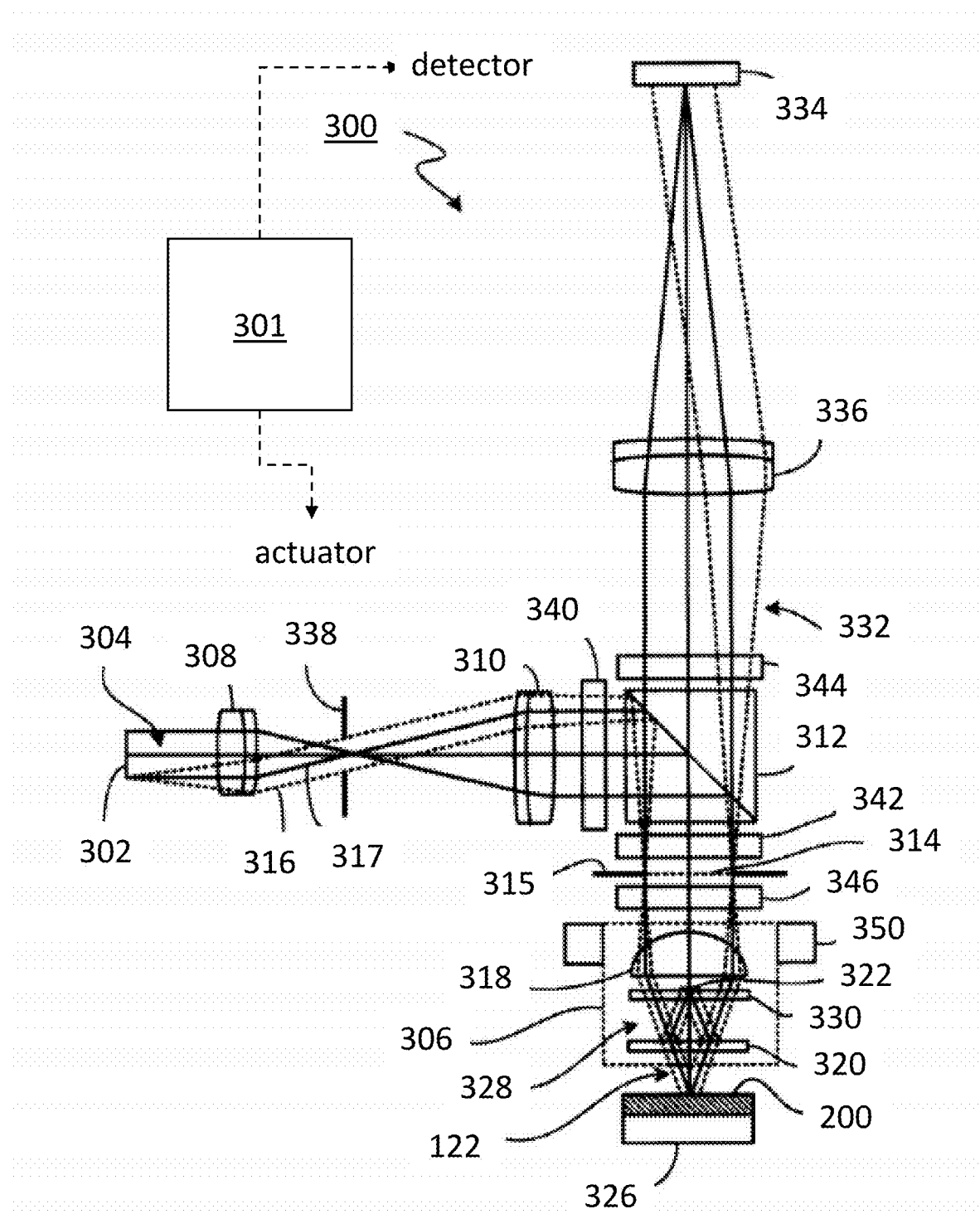
FIG. 3 is a schematic diagram of a coherence scanning interferometry microscope.

Referring to FIG. 3, as an example, one type of optical metrology tool suitable for characterizing lens 200 is a CSI microscope 300. In this system, a light source 302 directs input light 304 to an interference objective 306 via relay optics 308 and 310 and beam splitter 312. The relay optics 308 and 310 image input light 304 from spatially extended source 302 to an aperture stop 315 and corresponding pupil plane 314 of the interference objective 306 (as shown by the dotted marginal rays 316 and solid chief rays 317).

In the embodiment of the FIG. 3, interference objective 306 is of the Mirau-type, including an objective lens 318, beam splitter 320, and reference surface 322. Beam splitter 320 separates input light 304 into test light 322, which is directed to lens 200 supported by a stage 326, and reference light 328, which reflects from reference surface 322. Objective lens 318 focuses the test and reference light to the test and reference surfaces, respectively. The reference optic 330 supporting reference surface 322 is coated to be reflective only for the focused reference light, so that the majority of the input light passes through the reference optic before being split by beam splitter 320.

After reflecting from the test and reference surfaces, the test and reference light are recombined by beams splitter 320 to form combined light 332, which is transmitted by beam splitter 312 and relay lens 336 to form an optical interference pattern on an electronic detector 334 (for example, a multi-element CCD or CMOS detector). The intensity profile of the optical interference pattern across the detector is measured by different elements of the detector and stored in an electronic processor 301 (e.g., a standalone or networked computer, or processor integrated with other components of the system) for analysis. Relay lens 336 images different points in a focal plane of the objective 306 to corresponding points on detector 334.

A field stop 338 positioned between relay optics 308 and 310 defines the area of test surface 324 illuminated by test light 122. After reflection from the lens 200 and reference surface, combined light 332 forms a secondary image of the source at pupil plane 314 of the objective lens.

Optionally, polarization elements 340, 342, 344, and 346 define the polarization state of the test and reference light being directed to the respective test and reference surfaces, and that of the combined light being directed to the detector. Depending on the embodiment, each polarization element can be a polarizer (e.g., a linear polarizer), a retardation plate (e.g., a half or quarter wave plate), or a similar optic that affects the polarization state of an incident beam. Furthermore, in some embodiments one or more of the polarization elements can be absent. Moreover, depending on the embodiment, beam splitter 312 can be a polarizing beam splitter or a non-polarizing beam splitter. In general, because of the presence of polarization elements 340, 342 and/or 346, the state of polarization of test light 322 at test surface 324 can be function of the azimuthal position of the light in pupil plane 314.

In the presently described embodiment, source 302 provides illumination over a broad band of wavelengths (e.g., an emission spectrum having a full-width, half-maximum of more than 20 nm, of more than 50 nm, or preferably, even more than 100 nm). For example, source 302 can be a white light emitting diode (LED), a filament of a halogen bulb, an arc lamp such as a Xenon arc lamp or a so-called supercontinuum source that uses non-linear effects in optical materials to generate very broad source spectra (>200 nm). The broad band of wavelengths corresponds to a limited coherence length. A translation stage 350 adjusts the relative optic path length between the test and reference light to produce an optical interference signal at each of the detector elements. For example, in the embodiment of FIG. 3, translation stage 350 is a piezoelectric transducer coupled to interference objective 306 to adjust the distance between the test surface and the interference objective, and thereby vary the relative optical path length between the test and reference light at the detector.

Referring back to FIG. 2A, optical instrument 201 looks down at the lens 200 along an observation direction parallel to the z-axis shown in FIG. 2A. In the figure, S1 and S2 denote light reflections from the upper and lower nominally plane-parallel surfaces 211 and 212 on the lens 200, respectively. During metrology data acquisition the system collects height information of these surfaces in the global coordinate system x, y, z. This coordinate system is established by optical instrument 201. Ideally, the rotation axes of the lens surfaces is aligned nominally parallel to the z-axis.

Metrology information for the upper surface 211 of the lens 200 is derived from the reflection of light in air (signal "S1" in the figure). Respectively, metrology information for the lower surface 212 of the lens 200 is derived from the reflection of light within the lens material (signal "S2") in the figure.

Considering the specific example of a CSI microscope system such as system 300, the relative distance T between the upper and lower surfaces 211 and 212 at a specific coordinate x, y will be given by $$T = T'/n_G \tag{1}$$

where T' is the apparent or measured optical thickness as determined by CSI microscopy or by wavelength-tuned FTPSI using coherence information, and $n_G$ at low NA (e.g., 0.06 or less) is the group-velocity index of refraction (at high NA, e.g., 0.2 or more, the value $n_G$ could change because of the obliquity effect, resulting in an effective group-velocity index of refraction). Conversely, signal S2 will appear to originate at a higher z location when using confocal, structured illumination or focus sensing. The physical thickness in this case is given by $$T = nT'' \tag{2}$$

where T" is the apparent or measured optical thickness as determined by confocal or related focus-sensitive instruments, and n is the phase-velocity index of refraction.

The thickness map T'(x, y) or T"(x, y) provides information about the mean value and uniformity of the physical thickness T(x, y) as well as the optical properties of the lens 200 as exemplified by the index of refraction $n_G(x, y)$ or $n(x, y)$. In some cases, the composite uniformity and mean value of both of these properties, dimensional and optical, is sufficient for process control in the manufacture of the lens 200.

If desired, additional information such as the thickness map T(x, y) or the optical refractive index n(x, y) obtained by other means, such as by contact profilometry (as disclosed, e.g., in P. Scott, "Recent Developments in the Measurement of Aspheric Surfaces by Contact Stylus Instrumentation," Proc. SPIE 4927, 199-207 (2002)), may supplement the measurements performed by the optical metrology instrument 201, allowing for separation and independent evaluation of the effects of the refractive index from the physical thickness.

Figure 4A:
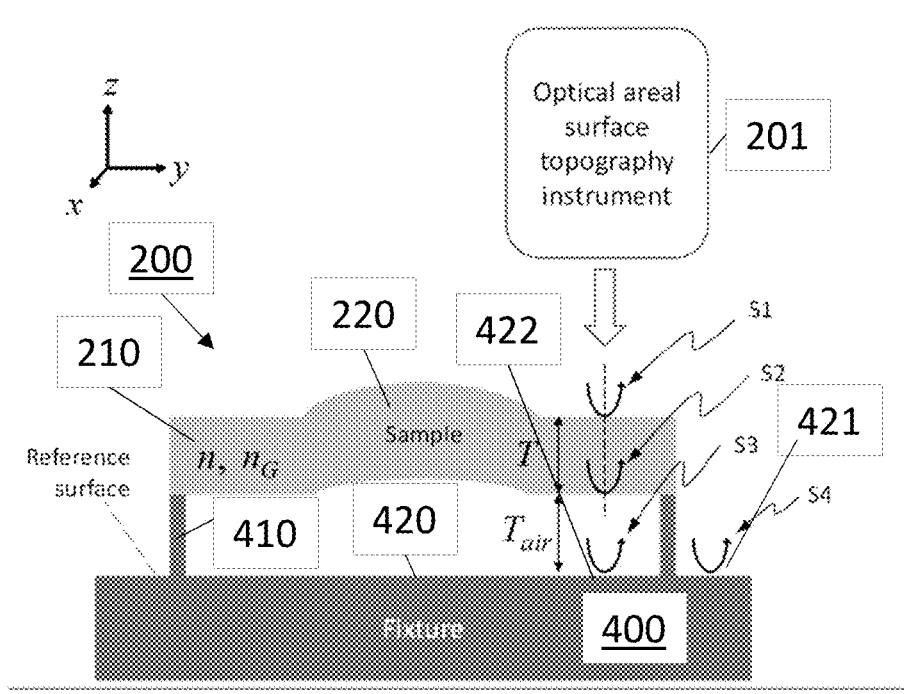
FIG. 4A is a side view of the sample lens under test mounted on a fixture having a reference surface.

While the foregoing lens characterization relies on height profile information about surfaces 211 and 212 alone, lens characterization may utilize other information too. For example, in some implementations, a specialized reference fixture is included to provide additional optical information. Referring to FIG. 4A, in certain embodiments, lens 200 is mounted on a fixture 400 having an embedded reference surface 420. In FIG. 4A, S1, S2 and S3 denote reflected light from the upper and lower surfaces of interest (211 and 212) of the lens 200, and the upper surface 420 of the fixture reference, which is separate from lower lens surface 212 by a distance $T_{air}$ as measured along the z-axis.

Fixture 400 includes support structures 410 and reflective upper surface 420. Lens 200 rests on support structures 410, which position the lens a distance $T_{air}$ from reflective surface 420. Support structures 410 may be composed of multiple pillars or walls on opposing sides of lens 200, or may be a single cylindrical support separating an inner portion 422 from an outer portion 421 of reflective surface 420. Fixture 400 may be tailored specifically for lens 200, and may be replaced with another fixture when a different shaped lens is measured.

Figures 4B, 4C:
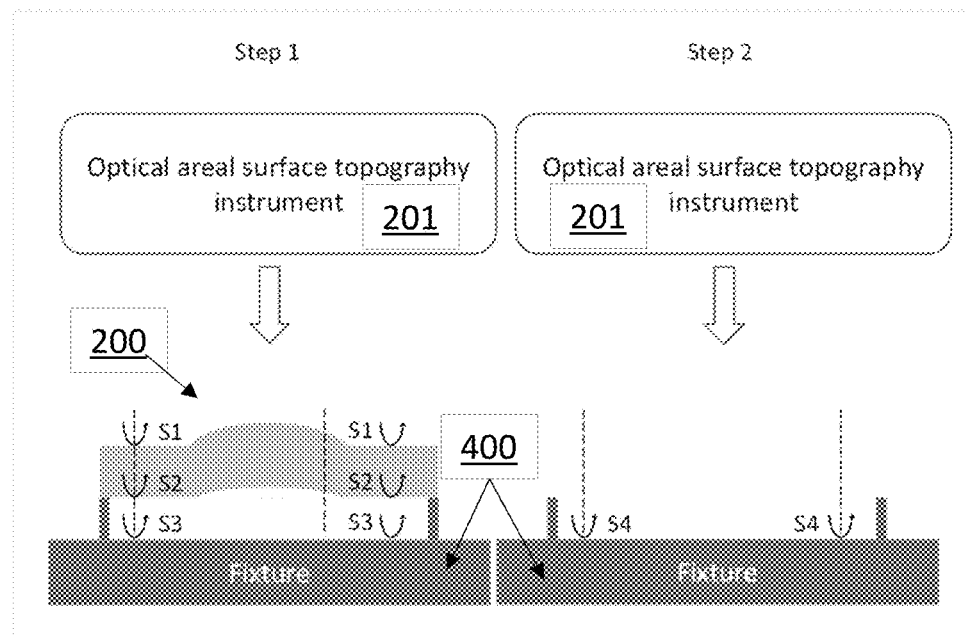
FIGS. 4B and 4C are side views of the sample lens and fixture shown in FIG. 4A, showing two steps in a measurement sequence.
Figure 5:
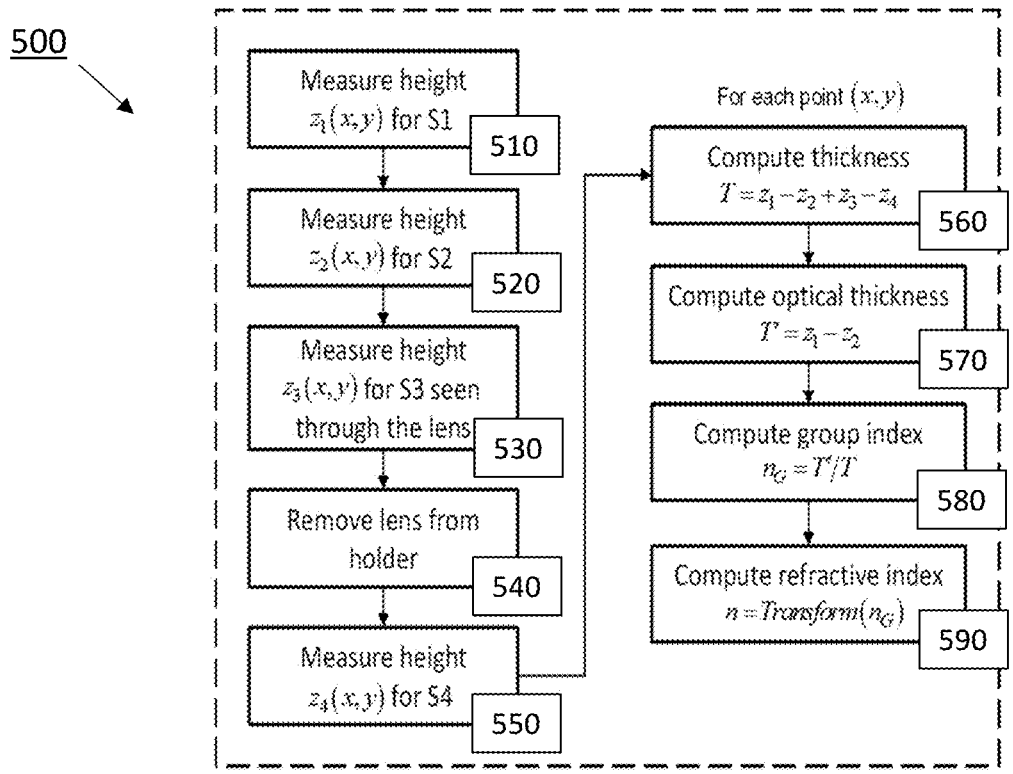
FIG. 5 is a flowchart showing a process flow for an implementation using coherence scanning interferometry (CSI) and the steps shown in FIGS. 4B and 4C.

FIGS. 4B and 4C show two successive measurement steps with the optical instrument 201 measuring over the full field of the plane parallel portions 210 of the lens 200. These steps provide the metrology information, including height profile measurements of surfaces 211, 212, and 420, to complete a characterization of the geometry and optical properties of the lens according to the flowchart 500 of FIG. 5. Apparent height measurements $z_{1, \ldots 4}$ correspond to reflected light S1 . . . S4, respectively, in the figure.

In a first step, depicted in FIG. 4B, metrology information is collected for the three surfaces 211, 212, and 420 (steps 510, 520, 530), where the lower surface 212 and auxiliary reference surface 420 are measured through the lens material and hence correspond to apparent heights. The metrology information is collected for the three surfaces without adjusting the position of the lens on the fixture.

In a second step, depicted in FIG. 4C, the lens is removed from the fixture 400 (step 540) and the auxiliary reference surface 420 is measured a second time (signal S4) (step 550).

The metrology information is combined to create maps of the thickness and refractive index distribution between the upper and lower parallel surfaces of the lens element. For coherence scanning interferometers and comparable interferometric instruments, after acquiring the apparent height information $z_{1, \ldots 4}$, the physical and optical thickness maps are, respectively:

$$T(x,y) = z_1(x,y) - z_2(x,y) + z_3(x,y) - z_4(x,y) \tag{3}$$

$$T'(x,y) = z_1(x,y) - z_2(x,y). \tag{4}$$

The map of the group-velocity refractive index is then $$n_G(x,y) = T'(x,y)/T(x,y) \tag{5}$$

When the metrology system relies on confocal, structured illumination or focus sensing surface profiling, Eqs. (4) and (5) become $$T'(x,y) = z_1(x,y) - z_2(x,y), \quad (6)$$

$$n = T/T'. \quad (7)$$

The thickness map provides information about the mean thickness of the lens as well as possible tilt between the two sides of the lens, based on variations in the measured thickness from one side of the lens to the other. The refractive index map provides information about possible refractive index gradients across the lens area.

As an optional additional step, knowing the nominal refractive dispersion properties of the material in the lens, it is often possible to transform the group index to the phase index:

$$n = \text{Transform}(n_G). \quad (8)$$

In some cases, the transform may be as simple as an additive constant. For instance, the additive constant is $$-\frac{\partial n(k)}{\partial k} k_0,$$

where n(k) is the nominal refractive index of the material (as stated by the manufacturer or measured through some other means), expressed as a function of wavenumber, and $k_0$ is the centroid wavenumber of the spectral band used for the measurement. Other transforms are possible such as a lookup table or polynomial function. Transform polynomials can be created by fitting data points of measured group index values (using the instrument) as a function of the known refractive index of test samples.

Figures 6A, 6B:
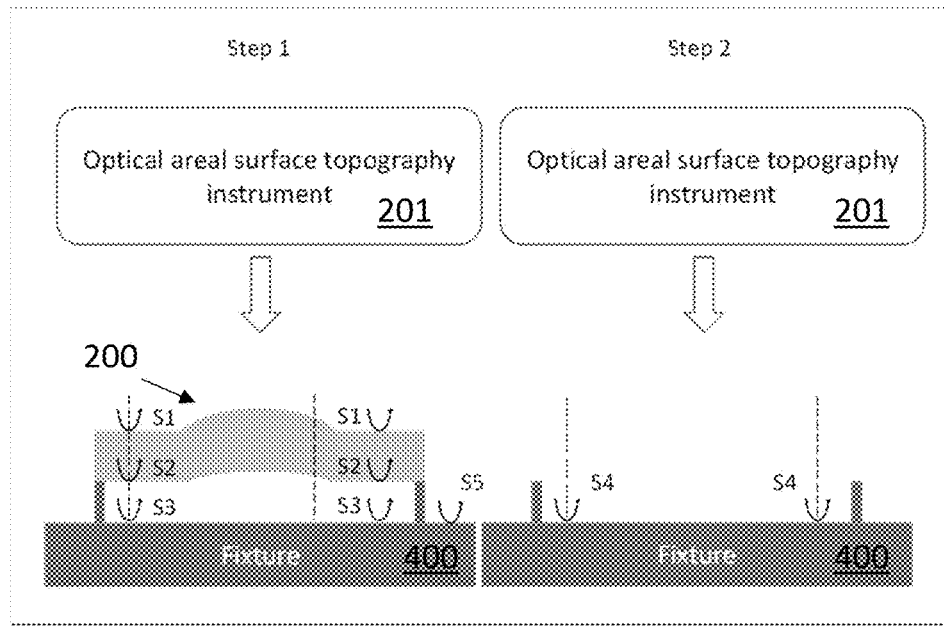
FIGS. 6A and 6B are side views showing measurement steps for another implementation.
Figure 7:
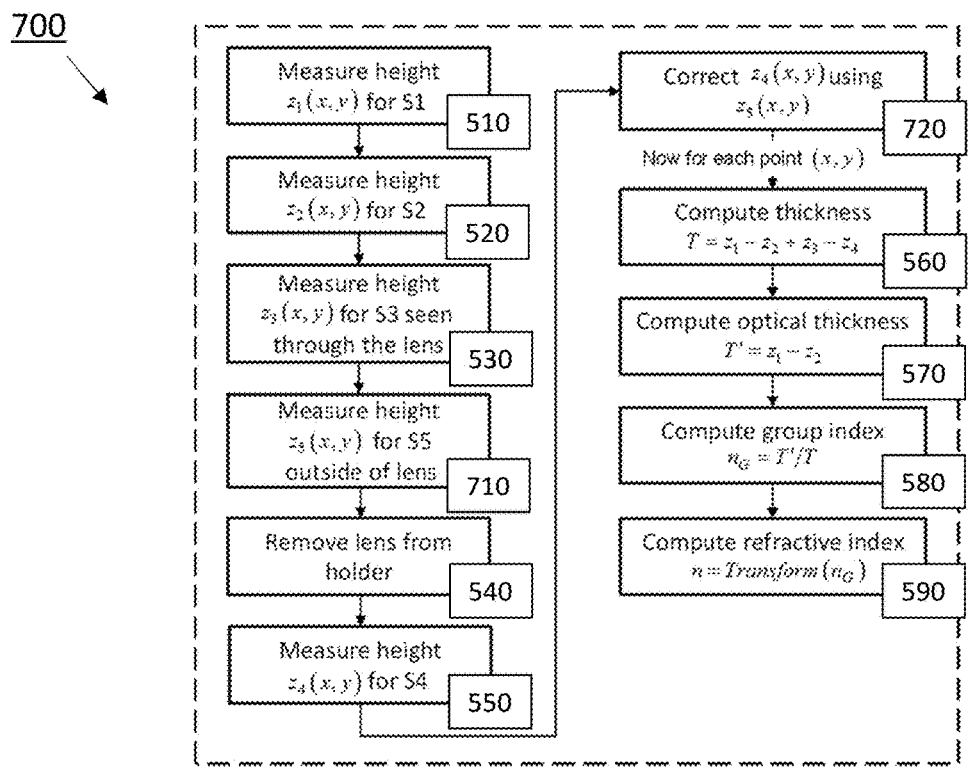
FIG. 7 is a flowchart showing a process flow for an implementation using CSI and the steps shown in FIGS. 6A and 6B.

Additional measurements may also be made in order to improve the accuracy of the process. For example, referring to FIGS. 6A, 6B, and 7, in some embodiments an additional measurement $z_5(x, y)$ for a reflection S5 from the fixture reference surface where the light path is unimpeded by lens 200 is captured simultaneously (step 710 in flowchart 700) with the lens image. This additional information provides, for example, the overall height offset of the fixture with respect to the optical instrument, for the case where the fixture may move between the two measurement steps. This information can correct the results of the $z_4(x, y)$ measurement by providing, for example, an offset or the combination of an offset, tip and tilt compensation for changes in the fixture position between measurements (step 720).

In some embodiments, the measurement is repeated for different configurations of the instrument such that data collection is performed with substantially different spectral distributions, for example, a first spectral distribution centered between 400 nm and 490 nm, a second spectral distribution centered between 490 nm and 590 nm and a third spectral distribution centered between 590 nm and 700 nm. Each spectral distribution provides an independent measurement of the optical properties of the lens material. The multiple measured values of group-velocity index or phase-velocity index can then be combined to derive an estimate of the material optical properties variation with wavelength (or dispersion), which can be used to verify that the material is within tolerances and/or for controlling the manufacturing process. In the case where the instrument measures group-index (e.g. a coherence scanning interferometer), the estimate of dispersion is further used to compute an estimate of the refractive index, for example using the product of the first order derivative by the centroid wavenumber. In some embodiments, the multiple spectral distributions are present concurrently while the instrument collects the data resulting from the scanning data acquisition. The multiple spectral bands are separated at the detector, for example using a color sensitive device (CCD or CMOS camera equipped with color filters). Alternatively, returning light from the sensor is spatially separated by dichroic optical elements that reflect or transmit specific spectral components toward multiple monochrome sensors. A minimum of two spectral bands is required to estimate the dispersion property of the material.

Figure 8:
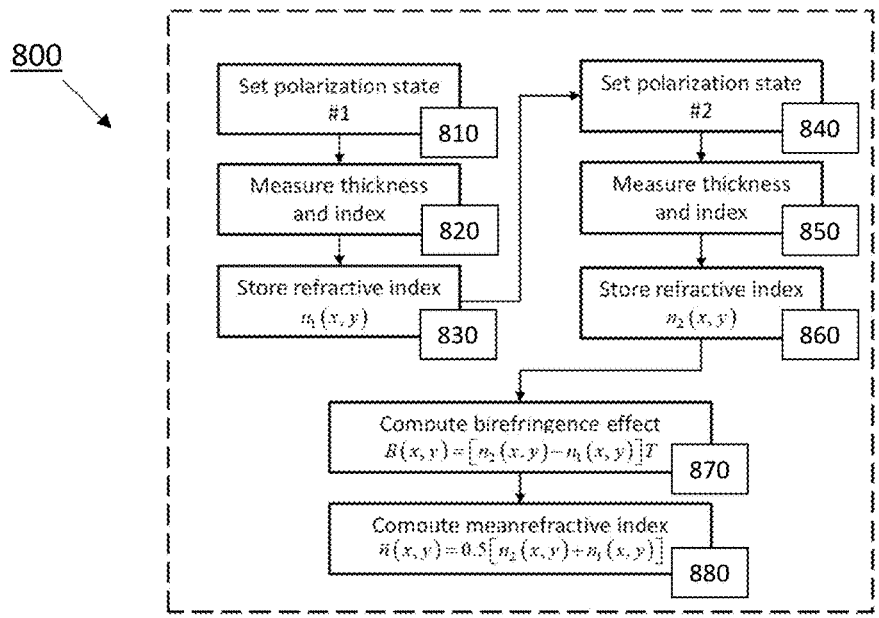
FIG. 8 is a flowchart showing a process flow for an implementation measuring birefringence between the upper and lower parallel surfaces of a lens.

While the foregoing measurements may be performed using polarized or unpolarized light, it is possible to glean additional information about lens 200 using polarized light. For example, referring to FIG. 8, information about the polarization-dependent optical properties of the lens, including the effect of stress birefringence, which can reveal problems with the lens (or other partially-transparent sample) manufacture, may be determined. In most cases, a lens free of stress and associated stress birefringence is a design goal for manufacturing process control.

The presence of stress birefringence in a sample may be monitored by observing its effects in the plane-parallel areas of the sample. Here, the measurement process outlined in flowchart 500 or flowchart 700 is performed at least twice, where each complete data acquisition cycle is performed for a different polarization state of the illumination light used by the metrology system. The polarization state of the optical measurement instrument may be manipulated using conventional polarizers and/or waveplates.

For example, as shown in flowchart 800, a first measurement is performed with the illumination light linearly polarized along the x direction and repeated with illumination light linearly polarized along the y direction. In some embodiments, the polarization directions are aligned with respect to datum features on lens 200, such as where the lens is an injection-molded lens the datum features may correspond to the gate where the injected material enters the mold cavity.

The multiple refractive index maps collected are then combined to provide a quantitative measurement of birefringence present in the lens material. For example, in step 870, a birefringence effect is calculated from the measurements. In step 880, a mean refractive index is calculated from the measurements. Birefringence may be, for example, expressed as the difference of optical paths through the lens, as shown in step 870 of flowchart 800. Here the cumulative effect of birefringence through the lens is calculated as $$B(x,y) = [n_2(x,y) - n_1(x,y)] \quad (9)$$

while the mean index (as shown in step 880) is $$\bar{n}(x,y) = 0.5[n_2(x,y) + n_1(x,y)]. \quad (10)$$

Birefringence can similarly be expressed as the difference of optical path per unit length of propagation within the material. The phase-velocity refractive indices $n_{1,2}$ correspond to the two polarization orientations. For process control, these indices are adequately represented by the group index measurements that follow, for example, from CSI microscope measurements. Further, for some process control situations, a measurement of optical thickness variation $$B'(x,y) = T'_2(x,y) - T'_1(x,y) \quad (11)$$

or $$B''(x,y) = T''_2(x,y) - T''_1(x,y) \quad (12)$$

using the simpler configuration of FIG. 2A may already be sufficient.

While the foregoing embodiments involve measurements characterizing the inactive portion (e.g., plane parallel portion) of the lens and inferring information about the lens generally from those characterizations, other implementations are also possible. For example, measurements directly characterizing the active portion of the lens can also be performed.

Figure 9:
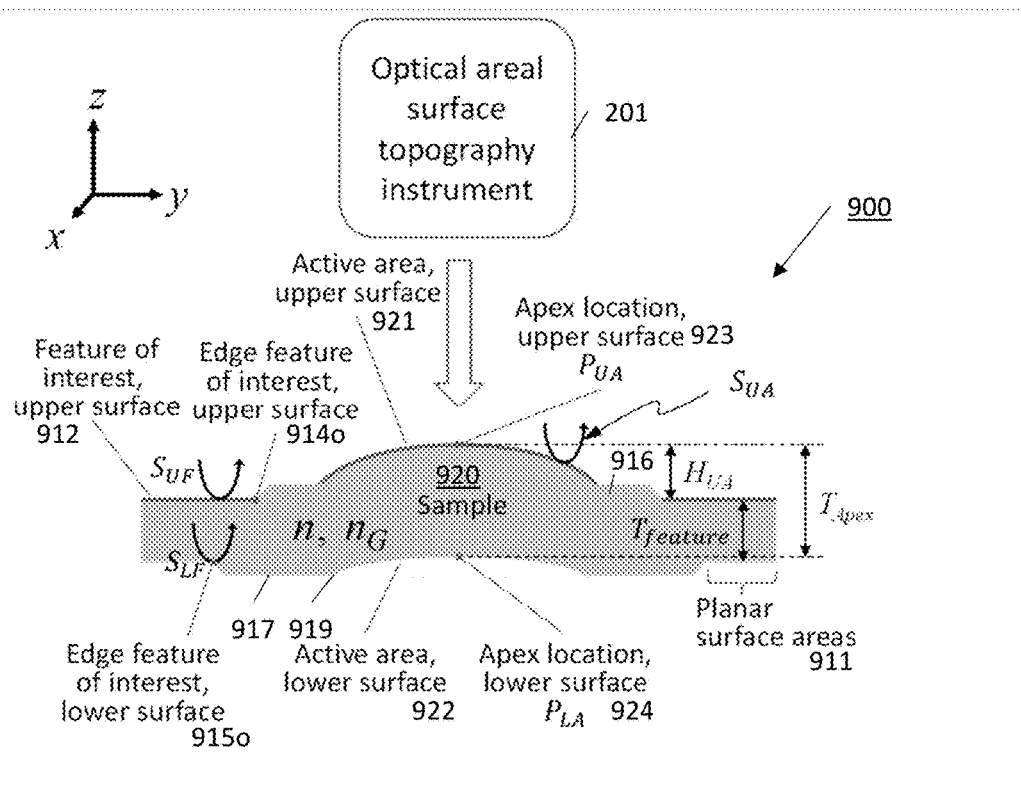
FIG. 9 is a side view of another sample lens under test.
Figure 10:
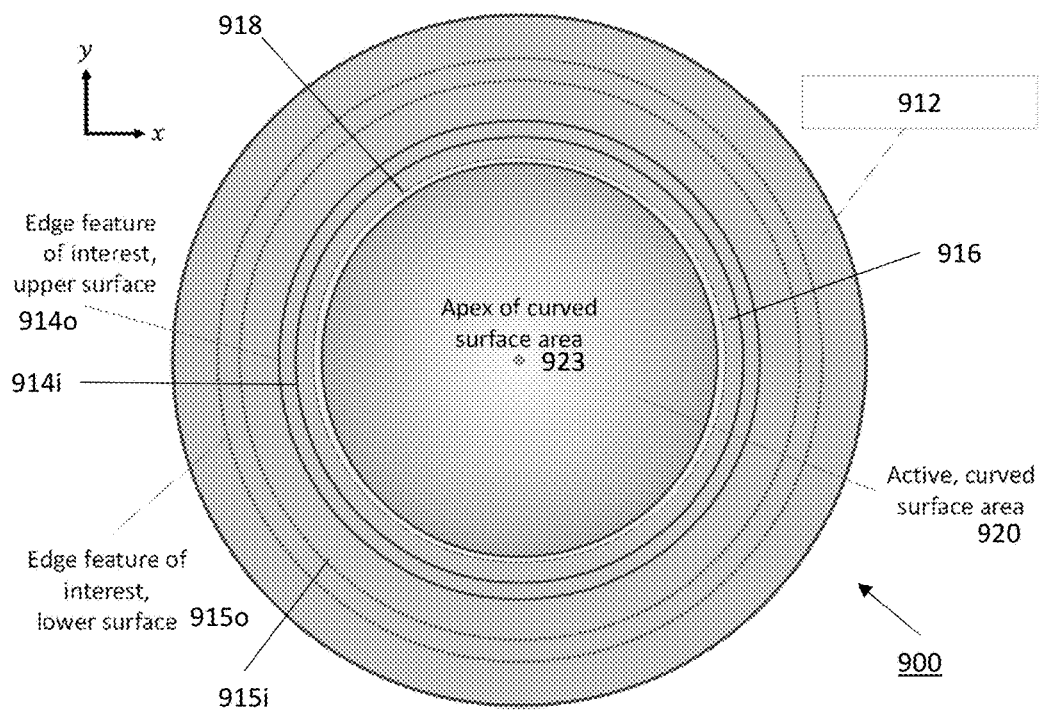
FIG. 10 shows is a top view of the sample lens under test shown in FIG. 9.

Referring to FIGS. 9 and 10, a sample lens 900 under test, includes an active portion 920 having curved surfaces, and an inactive portion, composed of several nominally planar surfaces surrounding the active portion. FIG. 9 shows a side view of lens 900, while FIG. 10 shows a top view. The active portion 920 corresponds to a convex upper surface 921 and a convex lower surface 922. Upper surface 921 has an apex 923 nominally aligned along the same axis as an apex 924 of lower surface 922.

The inactive portion is composed of a series of planar, annular surfaces with step features offsetting inner and outer planar surfaces on each side of lens 900. In general, the surfaces of the inactive portion may, for example, include features formed on the sample to aid in the alignment and fixturing of the lens in a final assembly, and/or to facilitate measurement of the relative alignment of lens features. In this case, the upper side of the inactive portion includes planar surfaces 912 and 916. A step 914 separates surfaces 912 and 916. Step 914 meets surface 912 at edge 914o and surface 916 at edge 914i. Surface 916 meets upper convex surface 921 at edge 918.

The lower side of the inactive portion includes planar surfaces 911 and 917. A step 915 separates surfaces 911 and 917. Step 915 meets surface 911 at edge 915o and surface 917 at edge 915i. Surface 917 meets lower concave surface 922 at edge 919.

Optical metrology instrument 201 is used to evaluate some of the dimensional features of lens 900, including (but not limited) to the apex-to-apex thickness $T_{Apex}$ and the relative x, y lateral offsets (referred to a common axis z) of surface feature locations, including (but not limited to) apex centers and alignment surface features. These evaluations are performed by measuring the upper surface profile to determine 3D apex location and relative 3D location and topography of other surface features. These measurements serve as indicators of the overall dimensional properties of the lens.

During operation, optical instrument 201 looks down at the sample along an observation direction parallel to the z-axis shown in FIG. 9, corresponding to an optical axis of instrument 201. During metrology data acquisition the system collects height and intensity information for surfaces of interest in the global coordinate system x, y, z.

Metrology information for apex 923 is derived from the reflection of light in air (signal $S_{UA}$ in FIG. 9), as is metrology information for other features of interest in the upper surface (signal $S_{UF}$ in FIG. 9). Respectively, metrology information for features of interest in the lower surface is derived from the reflection of light within the lens material (signal $S_{LF}$ in FIG. 9).

Considering the specific example of a CSI microscope system such as that shown in FIG. 3, signal $S_{UA}$ is generally processed to produce height information which can then be analyzed to determine the 3D location of the apex 923, $P_{UA}$. Height information derived from signal $S_{UF}$ can be combined with $P_{UA}$ to determine $H_{UA}$, the apex height in z relative to the upper surface feature of interest, surface 912. This same height information may also be used to determine the location of upper surface edge features, for example nominally circular edges of the upper surface feature of interest 912. Alternatively, or additionally, signal $S_{UF}$ can be processed to produce intensity information which can then be analyzed to determine the location of upper surface edge features 914o.

Figure 12:
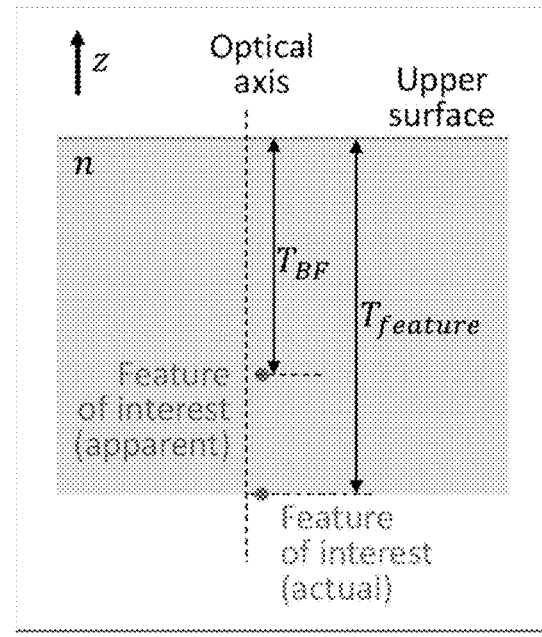
FIG. 12 is a schematic diagram showing apparent and actual best focus position for a feature of interest measured through the sample.

$S_{LF}$ is a non-interferometric intensity signal which may be analyzed to determine the location of lower surface edge features 915o. Referring to FIG. 12, $S_{LF}$ may be measured with a microscope system at a z position of best focus, shown in FIG. 12, displaced by $T_{BF}$ relative to the focal plane of the upper surface at that x, y location. For thickness $T_{feature}$ and refractive index n, $T_{BF}$ can be computed for near-normal incident angles as:

$$T_{BF} = T_{feature}/n \tag{13}$$

For this computation, thickness and index may be assumed nominal values or previously measured by some other means, e.g., using the same instrument or a caliper. Depending on the required accuracy for a given application, it can further be beneficial to compensate for the effect of spherical aberration induced by refraction through the lens material, and compute a corrected value for $T_{BF}$, e.g., using the formula:

$$T_{BF} = \frac{T_{feature}}{n}\left(1 - \frac{NA^2}{4}\left(1 - \frac{1}{n^2}\right)\right), \tag{13B}$$

where NA refers to the numerical aperture of the optical instrument.

The lateral location of the upper surface apex $C_{UA}$ is given by the x, y ordinates of $P_{UA}$. The location of other features of interest can be defined in other ways, for example as the center of measured edge positions, indicated as $C_{UF}$ and $C_{LF}$ in FIG. 11. Lateral distances between these locations correspond to offsets between axes parallel with the z-axis, implicitly referred to a datum plane, and in some cases corresponding to a planar feature of the upper surface. For example, the inter-feature lateral distance $XY_{Feature}$ can be computed as:

$$XY_{Feature} = C_{UF} - C_{LF} \tag{14}$$

Similarly, the upper surface apex-to-feature lateral distance $XY_{UAF}$ can be computed as:

$$XY_{UAF} = C_{UA} - C_{UF} \tag{15}$$

In some cases, $XY_{Feature}$ is sufficient for process control in the manufacture of the lenses, for example as a measure of the lateral alignment of the mold halves. Similarly, $XY_{UAF}$ along with relative apex height $H_{UA}$ may be sufficient for identifying issues with lens formation, for example if these deviate from dimensions expected from the upper surface mold half.

Figure 11:
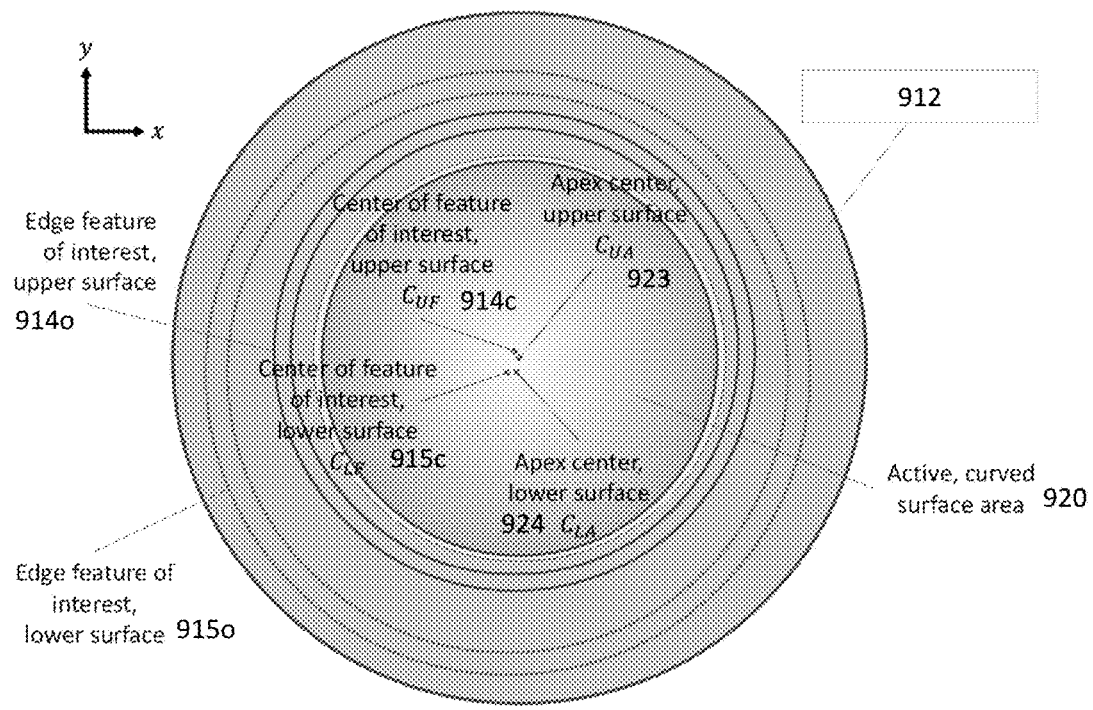
FIG. 11 shows another top view of the sample lens under test shown in FIG. 9, depicting in more detail lateral locations of interest with exaggerated decentering for illustration purposes.

It may be desired to explicitly measure dimensional properties between the upper surface apex and the lower surface apex, such as apex thickness $T_{Apex}$ indicated in FIG. 9 or inter-apex lateral distance $XY_{Apex}$, corresponding to the lateral distance between $C_{UA}$ and $C_{LA}$ indicated in FIG. 11. In some embodiments, and with reference to FIG. 13, this can be achieved by additionally measuring lens 900 oriented with lower surfaces 911, 917, and 922 facing the optical instrument 201, while keeping track of azimuthal orientation relative to the measurement made with the upper surfaces of lens 900 facing optical instrument 201. Using methods similar to those described for the first measurement, this second measurement provides $H_{LA}$, $P_{LA}$, and lower surface apex-to-feature lateral distance $XY_{LAF}$, corresponding to the lateral distance between $C_{LA}$ and $C_{LF}$:

$$XY_{LAF} = C_{LA} - C_{LF} \quad (16)$$

Figure 13:
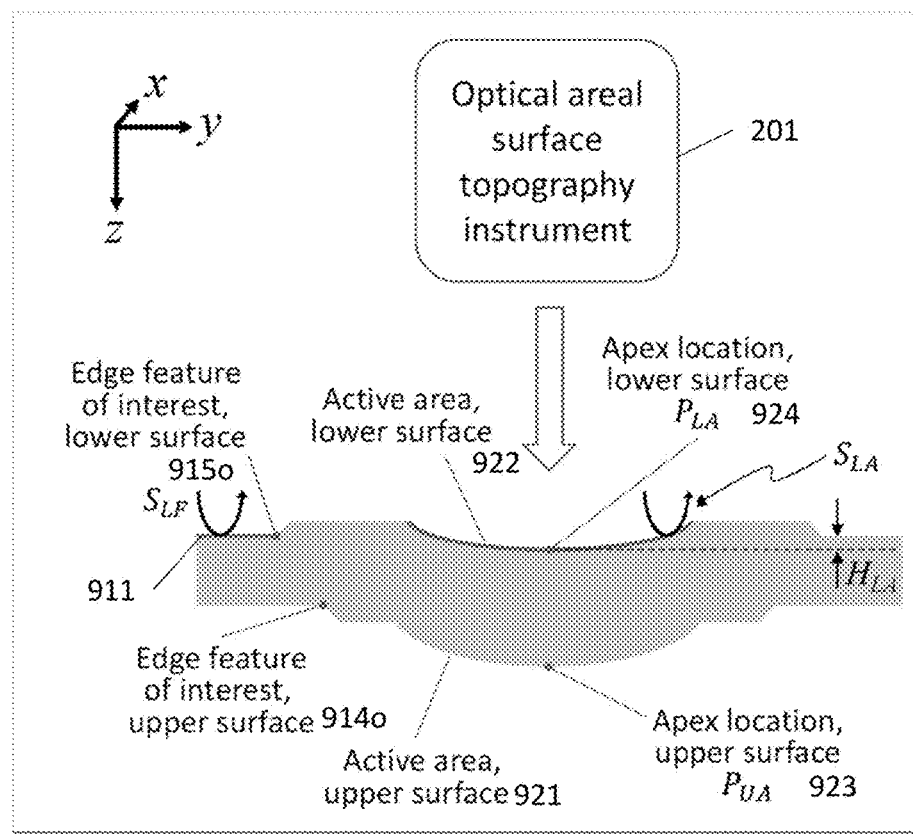
FIG. 13 shows a side view of the sample lens under test shown in FIG. 9, here with the concave lens surface facing the optical instrument.

Note that $H_{LA}$ is negative for the particular geometry depicted in FIG. 13.

In some cases this second measurement can provide an independent measurement of $XY_{Feature}$.

Figure 14:
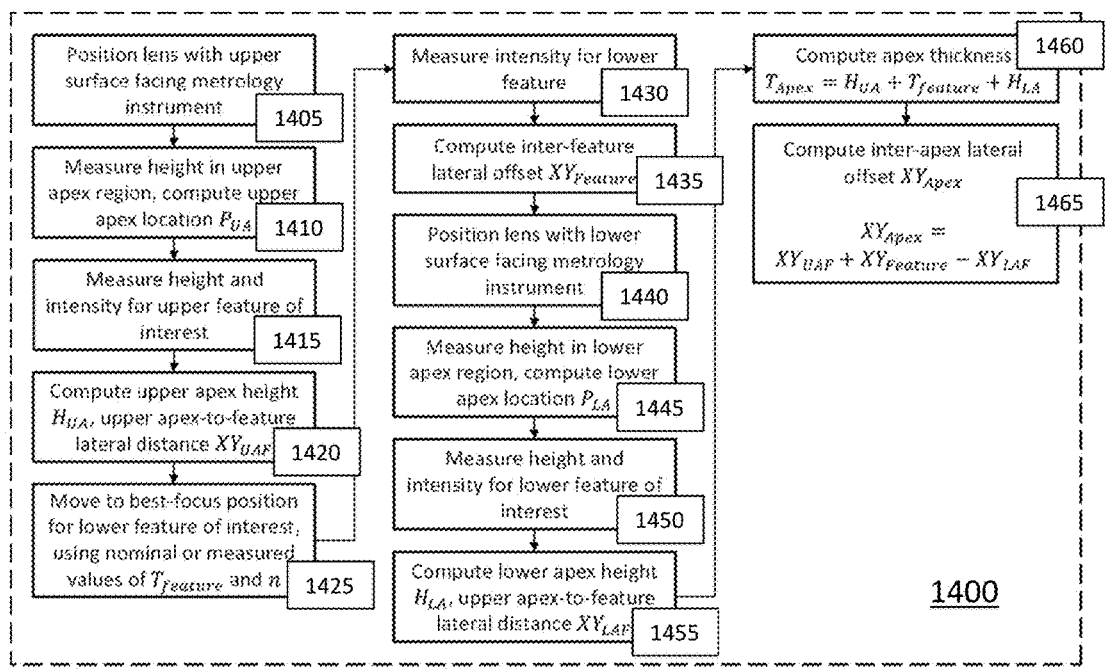
FIG. 14 is a flowchart showing a process flow for an implementation using CSI.

In some embodiments, metrology information from measuring the lens first with one surface facing the instrument, and then the other, is combined according to flowchart 1400 shown in FIG. 14 to create a measurement of total apex thickness and desired lateral distances. In this implementation, the sequence of steps is as follows: first, lens 900 is positioned with the upper surface facing metrology instrument 201 (step 1405). While in this configuration, metrology instrument 201 measures a height profile at least in the region of the apex of the upper surface and computes a location of this upper apex (step 1410). With lens 900 in the same position, instrument 201 measures a height profile and intensity profile for an upper feature of interest, such as edge 914o (step 1415). In step 1420, the system then computes upper apex height, $H_{UA}$, and upper apex-to-feature lateral distance, $XY_{UAF}$ (e.g., using equation (15)).

For measurement of lower surface features, metrology instrument 201 and lens 900 are moved relative to each other so that a lower feature of interest, such as edge 915o, is at a best focus position (step 1425). This location may be determined using nominal or measured values of $T_{feature}$ and $n$. In this position, the instrument measures an intensity profile for the lower feature (step 1430). Using information from the intensity profile, the system computes (in step 1435) an inter-feature lateral offset $XY_{Feature}$.

Next, lens 900 is flipped and positioned with its lower surface facing instrument 201 (step 1440). In this position, a height profile is measured in the region of lower apex 924, and a lower apex location, $P_{LA}$ is computed (step 1445). The system then, in step 1450, measures a height profile and an intensity profile for one or more features on the lower surface (e.g., edge 915o). With this measurement, the system compute a lower apex height, $H_{LA}$, and a lower apex-to-feature lateral distance $XY_{LAF}$ (step 1455).

In step 1460, apex thickness $T_{Apex}$ can be computed as:

$$T_{Apex} = H_{UA} - T_{feature} + H_{LA} \quad (17)$$

Finally, in step 1465, inter-apex lateral distance $XY_{Apex}$ corresponds to the lateral distance between $C_{UA}$ and $C_{LA}$ and can computed according to the following, where superscripts indicate whether parameters are obtained from the upper surface measurement or the lower surface measurement:

$$XY_{Apex} = XY_{UAF}^{upper} + (XY_{Feature})^{upper} - XY_{LAF}^{lower} \quad (18)$$

If the lower-surface measurement provides an independent measurement of the inter-feature lateral distance $XY_{Feature}$, the following expressions can optionally be used to potentially reduce statistical variability:

$$XY_{Feature} = 0.5[XY_{Feature}^{upper} + XY_{Feature}^{lower}] \quad (19)$$

$$XY_{Apex} = XY_{UAF}^{upper} + XY_{Feature}^{lower} - XY_{LAF}^{lower} \quad (20)$$

In some embodiments, as discussed previously with respect to FIGS. 4A-4C, the apparatus may include a part fixture that includes a nominally flat reflective surface, placed under the sample such that it reflects light that propagated through the sample back through sample and toward the metrology instrument. Such implementations may improve the contrast in the intensity images acquired using optical instrument 201.

In certain embodiments, the information regarding x, y spatial variations in areas including the features of interest may be exploited to more accurately determine dimensional features. For example, this information could include maps of refractive index $n(x, y)$, thickness $T(x, y)$, and surface topography $S_{UA}(x, y)$ and $S_{LA}(x, y)$.

Figure 15A:
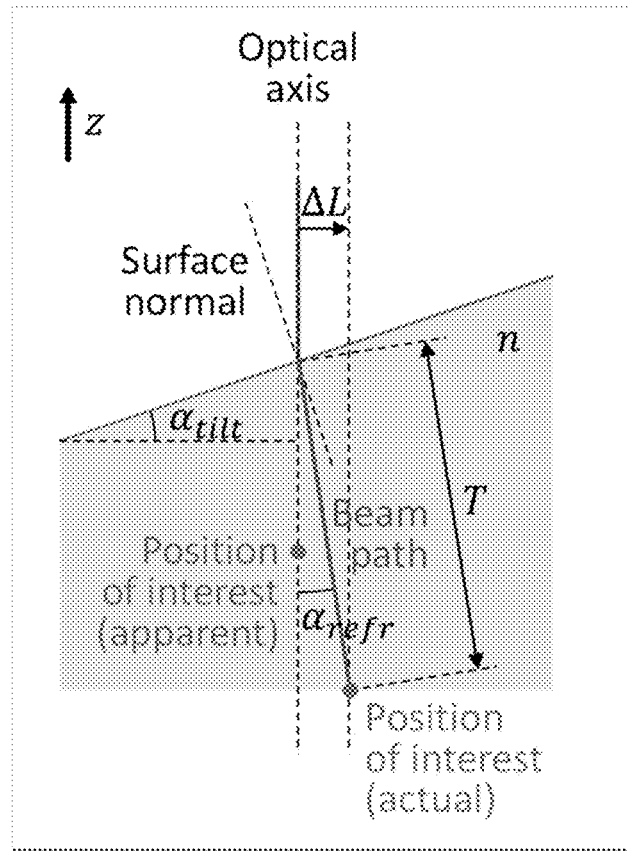
FIG. 15A is a schematic diagram showing apparent and actual position of interest corrected for refraction effects.
Figure 15B:
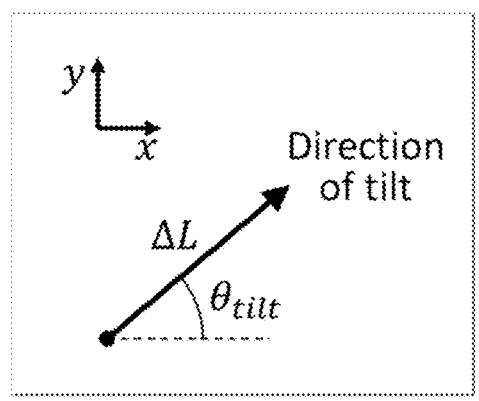
FIG. 15B illustrates azimuthal orientation of tilt and lateral shift due to refraction.

Referring to FIGS. 15A and 15B, the planar surface areas of a lens under test appear to be parallel but in practice there may be deviation from this ideal. For example, best-fit planes through the upper and lower features of interest may deviate from parallel. This can produce non-parallel part tilt for the first measurement (upper surface facing instrument) relative to the second measurement (lower surface facing instrument), for example if part tilt is adjusted relative to non-parallel features in the upper and lower surface respectively. These relative part tilts form a wedge angle W which can be derived from thickness map $T(x, y)$ and incorporated into computations of dimensional features. For example, apex thickness $T_{Apex}$ can be expressed as:

$$T_{Apex} = f_{ApexZ}(H_{UA}, T_{feature}, H_{LA}, W) \quad (21)$$

Lateral distances $XY_{Feature}$ and $XY_{Apex}$ can be expressed as:

$$XY_{Feature} = f_{FeatureXY}(C_{UF}, C_{LF}, W) \quad (22)$$

$$XY_{Apex} = f_{ApexXY}(XY_{UAF}, XY_{Feature}, XY_{LAF}, W) \quad (23)$$

FIG. 9 depicts a lower surface edge measured through an upper surface interface that appears to be perpendicular to the optical axis of the areal surface topography instrument but again in practice there may be deviation from this ideal. Moreover, this deviation can have (x, y) dependence, for example manifesting as variations in local tilt in the surface topography map $S_{UA}(x, y)$. FIG. 15A depicts a position of interest at a particular lateral location measured through a thickness T in a material with refractive index n measured by a light beam first encountering a surface tilted by $\alpha_{tilt}$ from perpendicular.

Due to refractive effects, there will be a lateral shift $\Delta L$ between the apparent and actual lateral location of the position of interest given approximately by:

$$\Delta L = T \sin(\alpha_{refr}) \quad (24)$$

where $\sin(\alpha_{refr})$ and $\sin(\alpha_{tilt})$ are related via Snell's law:

$$\sin(\alpha_{refr}) = \sin(\alpha_{tilt})/n. \quad (25)$$

Thus, $\Delta L$ is given by:

$$\Delta L = T \sin(\alpha_{tilt})/n. \quad (26)$$

In FIG. 15A, thickness T is depicted as being measured along the direction of the beam, as expected for certain thickness measurement methods with the sample in the same orientation. For some embodiments, T may correspond to the thickness along the optical axis. For the small values of $\alpha_{tilt}$ typically encountered the influence on $\Delta L$ of this potential difference is negligible.

Local tilt $\alpha_{tilt}$ will have some azimuthal orientation $\theta_{tilt}$ in the XY plane. As shown in FIG. 15B, lateral shift $\Delta L$ will have the same azimuthal orientation. Corrections to the x and y ordinates of the apparent location of the position of interest are then respectively:

$$\Delta x = \Delta L \cdot \cos(\theta_{tilt}) \quad (27)$$

$$\Delta y = \Delta L \cdot \sin(\theta_{tilt}) \quad (28)$$

In general, index n, thickness T, tilt $\alpha_{tilt}$ and azimuthal orientation $\theta_{tilt}$ will depend on lateral location (x, y), so $\Delta L$ will also generally be a function of (x, y). Refraction correction can be applied to each measured edge point, following which the collection of corrected edge points can be analyzed as desired to generate a corrected location for the feature of interest.

Figure 16:
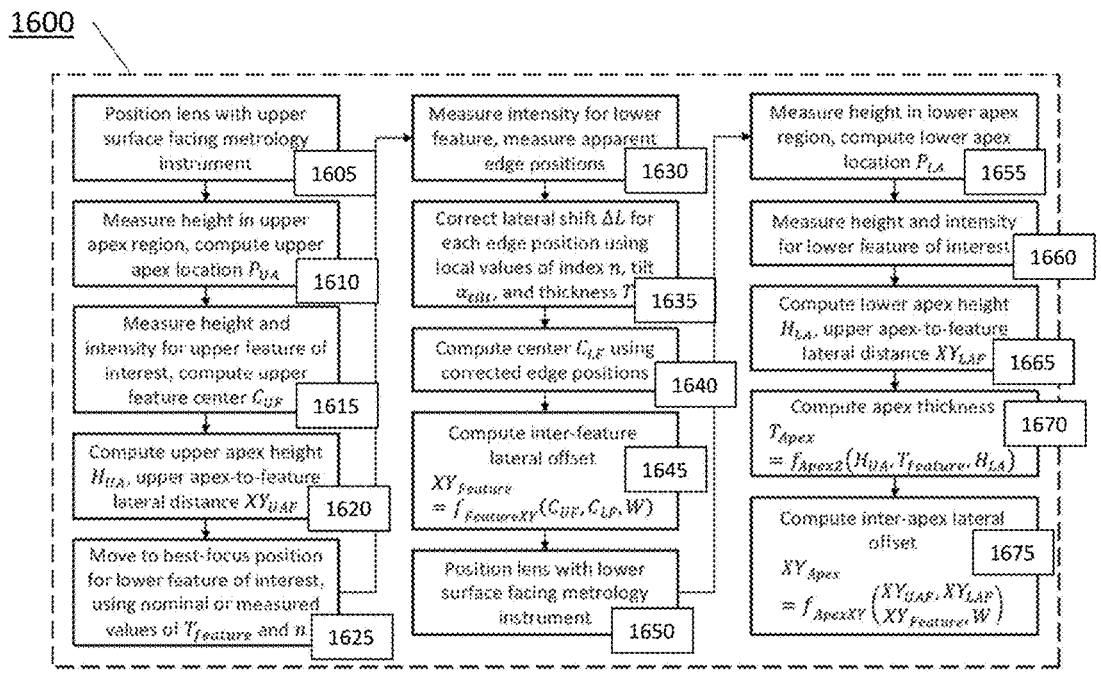
FIG. 16 is a flowchart showing a process flow for another implementation using CSI.

Referring to FIG. 16, an exemplary implementation that accounts for a tilt angle of the lens is shown in flowchart 1600. Here, the lens is first positioned with its upper surface facing the metrology instrument (step 1605) and the instrument is used to measure the height profile of the upper apex region and, from this measurement, compute the upper apex location $P_{UA}$ (step 1610). The system then measures a height and intensity profile for an upper feature of interest, such as upper surface 914 or an edge on the upper surface (step 1615). From this measurement, the system computes an upper feature center, $C_{UF}$. In step 1620, the system then computes an upper apex height HUA and upper apex-to-feature lateral distance $XY_{UAF}$. For the next measurement, using nominal or measured values for $T_{feature}$ and n, the system moves the lens relative to the optical instrument so that a lower feature of interest (e.g., a planar surface or edge) is in a best-focus position (step 1625). In this position, the system measures an intensity profile for the lower surface feature, and measures apparent edge positions on the lower surface (step 1630). These measurements are corrected by the system for lateral shift, $\Delta L$, for each edge position using local values of index n, tilt $\alpha_{tilt}$, and thickness, T (step 1635). Using the corrected edge positions, the system calculates a position of the center of the lower feature, $C_{LF}$ (step 1640). Having the positions of the upper and lower features ($C_{UF}$ and $C_{LF}$), and a wedge angle, W, the system computes an inter-feature lateral offset, $XY_{Feature}$ (step 1645). Here, the wedge angle corresponds to tilt in a thickness map of the lens.

Next, in step 1650, the lens is flipped so that the lower surface faces the optical instrument (step 1650) and a height profile of the lower apex region is acquired (step 1655). The system computes the lower apex location, $P_{LA}$, from this height profile. The system then measures a height profile and an intensity profile for the lower surface feature of interest (step 1660). $H_{LA}$, the lower surface apex height, and $XY_{LAF}$, the lower apex-to-feature lateral distance, are then computed (step 1665) from the information acquired from steps 1655 and 1660. Using this value for $H_{LA}$, along with values for $H_{UA}$ and $T_{feature}$, the system computes apex thickness, $T_{Apex}$ (step 1670). Using $XY_{UAF}$, $XY_{LAF}$, $XY_{Feature}$, and W, the system also computes a value for the inter-apex lateral offset, $XY_{Apex}$ (step 1675).

In some embodiments, the sample is measured at two or more azimuthal orientations relative to the optical instrument. By obtaining independent measurements of dimensional properties of the lens at different azimuthal orientations, the system can combine these independent measurements so as to reduce systematic error in the final reported dimensional properties.

Examples of sources of systematic error include misalignment between the optical axis and the scan axis, lateral or axial misalignment of the illumination, and bias in sample tilt.

Figures 17A, 17B:
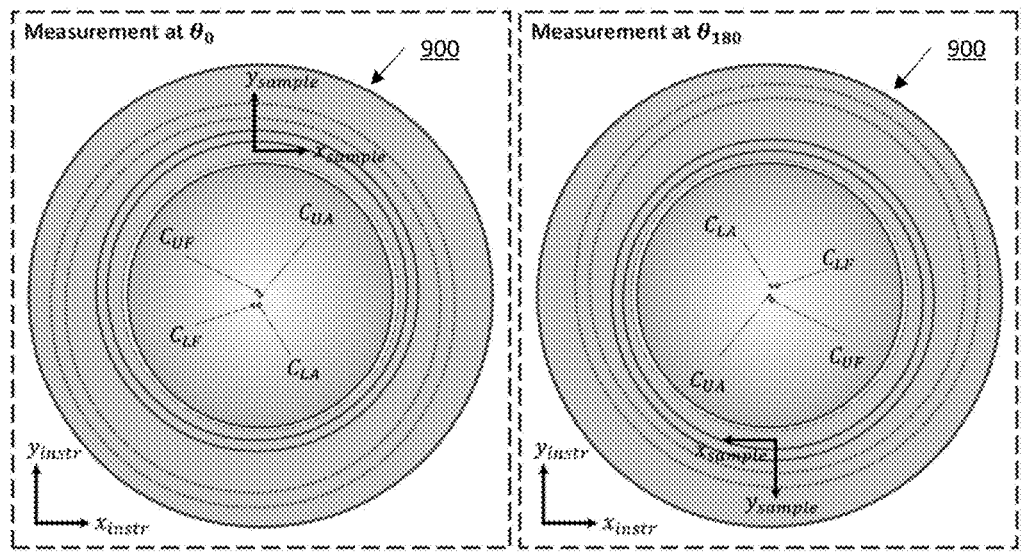
FIGS. 17A and 17B show top views of a lens in different sample-to-instrument azimuthal orientations.

In some cases, systematic error has a component that is independent of sample orientation. For example, the reported lateral distance between two particular features may be biased by some offset in instrument coordinates ($\Delta x_{bias}$, $\Delta y_{bias}$). This bias can depend on the particular sample features being measured. In such cases, systematic error in measured lateral distance can be reduced by combining measurements with the sample at an azimuthal orientation $\theta_0$ relative to the instrument as well as with the sample at an azimuthal orientation $\theta_{180}$ relative to the instrument, where $\theta_{180}$ should be offset by 180° relative to $\theta_0$. As depicted in FIGS. 17A and 17B, this corresponds to a relative azimuthal rotation of 180° between sample coordinates ($x_{sample}$, $y_{sample}$) and instrument coordinates ($x_{instr}$, $y_{instr}$). This relative azimuthal orientation can be achieved via sample fixturing or by aligning to a distinctive feature on the part itself. For instance, the sample support may include a rotation stage and scale that can be manually or automatically rotated about the optical axis of the optical instrument by a desired amount.

Figure 18:
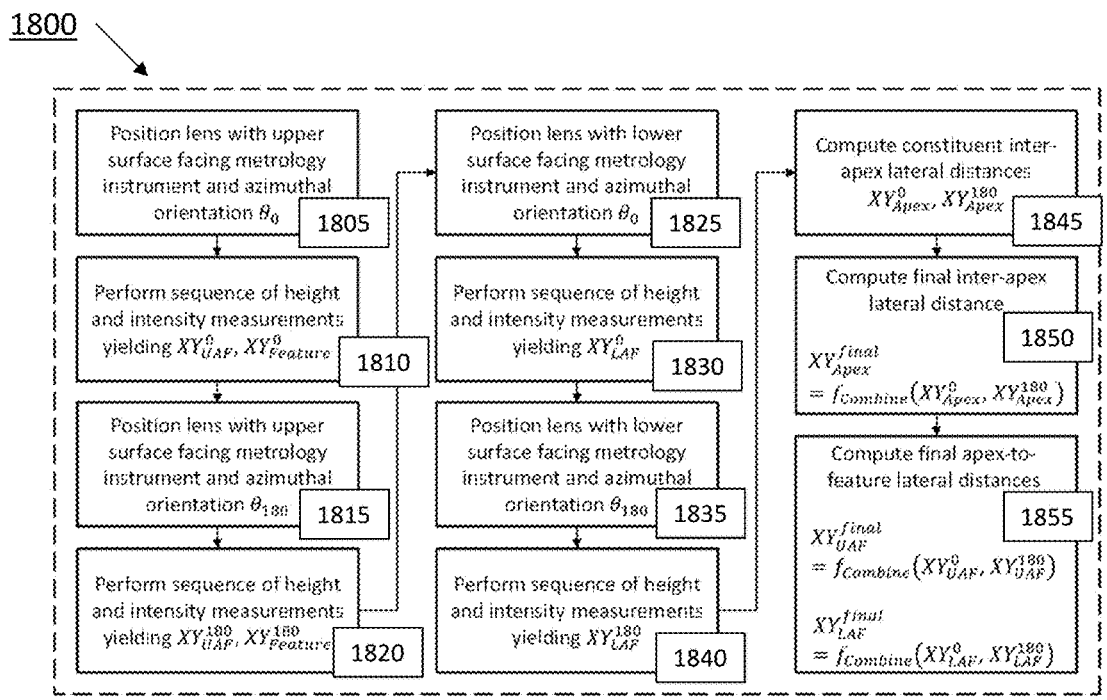
FIG. 18 is a flowchart showing process flow for a further implementation using CSI.

Referring top FIG. 18, an exemplary method utilizing sample rotation is shown in flowchart 1800. This process combines measurement sequences performed with the lens in four distinct orientations relative to the instrument:

Upper surface facing instrument at azimuthal orientation $\theta_0$

Upper surface facing instrument at azimuthal orientation $\theta_{180}$

Lower surface facing instrument at azimuthal orientation $\theta_0$

Lower surface facing instrument at azimuthal orientation $\theta_{180}$

Specific steps are as follows. First, the lens is positioned with its upper surface facing the optical instrument and at azimuthal orientation $\theta_0$ (step 1805). In this orientation, the system performs a sequence of height and intensity profile measurements and computes values for $XY_{UAF}^0$ and $XY_{Feature}^0$ (step 1810).

For the next measurement sequence, the lens is positioned with its upper surface facing the optical instrument and at azimuthal orientation $\theta_{180}$ (step 1815). In this orientation, the system performs a sequence of height and intensity profile measurements and computes values for $XY_{UAF}^{180}$ and $XY_{Feature}^{180}$ (step 1820).

For the subsequent measurement sequence, the lens is positioned with its lower surface facing the optical instrument and at azimuthal orientation $\theta_0$ (step 1825). In this orientation, the system performs a sequence of height and intensity profile measurements and computes a value for $XY_{LAF}^0$ (step 1830).

For the final measurement sequence, the lens is positioned with its lower surface facing the optical instrument and at azimuthal orientation $\theta_{180}$ (step 1835). In this orientation, the system performs a sequence of height and intensity profile measurements and computes a value for $XY_{LAF}^{180}$ (step 1840). The order in which measurements are made at these relative orientations is not critical, and can be governed by what is most convenient.

The computed values are next used to compute constituent inter-apex lateral distances for each orientation, $XY_{Apex}^0$ and $X_{Apex}^{180}$ (step 1845). Finally, using these constituent values, the system computes an inter-apex lateral distance, $XY_{Apex}^{final}$ (step 1850), and final apex-to-feature lateral distances, $XY_{UAF}^{final}$ and $XY_{LAF}^{final}$ (step 1855).

Final reported lateral distances $XY^{final}$ are computed by combining the corresponding lateral distances measured at $\theta_0$ and $\theta_{180}$, respectively $XY^0$ and $XY^{180}$:

$$XY^{final} = f_{combine}(XY^0, XY^{180}) \quad (29)$$

The preceding equation can be applied to lateral distances of interest, including those discussed previously such as inter-feature lateral distance $XY_{Feature}$, apex-to-feature lateral distances $XY_{UAF}$ and $XY_{LAF}$, and inter-apex lateral distance $XY_{Apex}$. If constituent measurements of lateral distances are all in the sample's frame of reference, i.e., relative to sample coordinates ($x_{sample}$, $y_{sample}$), in some cases the combining function may be as simple as the arithmetic mean of constituent measurements. Alternatively, or additionally, some operations may map tool-reference-frame results to sample-reference-frame in a single step. Possible other operations can account for previously determined remnant tool bias.

As noted previously, another potential source of measurement error is material birefringence in the sample. In some cases, measurement error can be reduced by combining measurements obtained with the instrument in a variety of polarization states, for example using a polarizer and/or waveplate. This can further be combined with variations in relative azimuthal orientation of the sample relative to the instrument.

The apparatus and methods described above allow for evaluation of in-process transparent samples, including in particular, lenses including curved active surface areas as well as plane-parallel areas that serve as surrogates for determining the dimensional and optical properties of the samples. Transparent samples include lenses, such as molded lenses that are part of multi-lens lens assemblies, e.g., for digital cameras. Such lens assemblies are extensively used in cameras for mobile devices, such as cell phones, smart phones, and tablet computers, among other examples.

Figure 19:
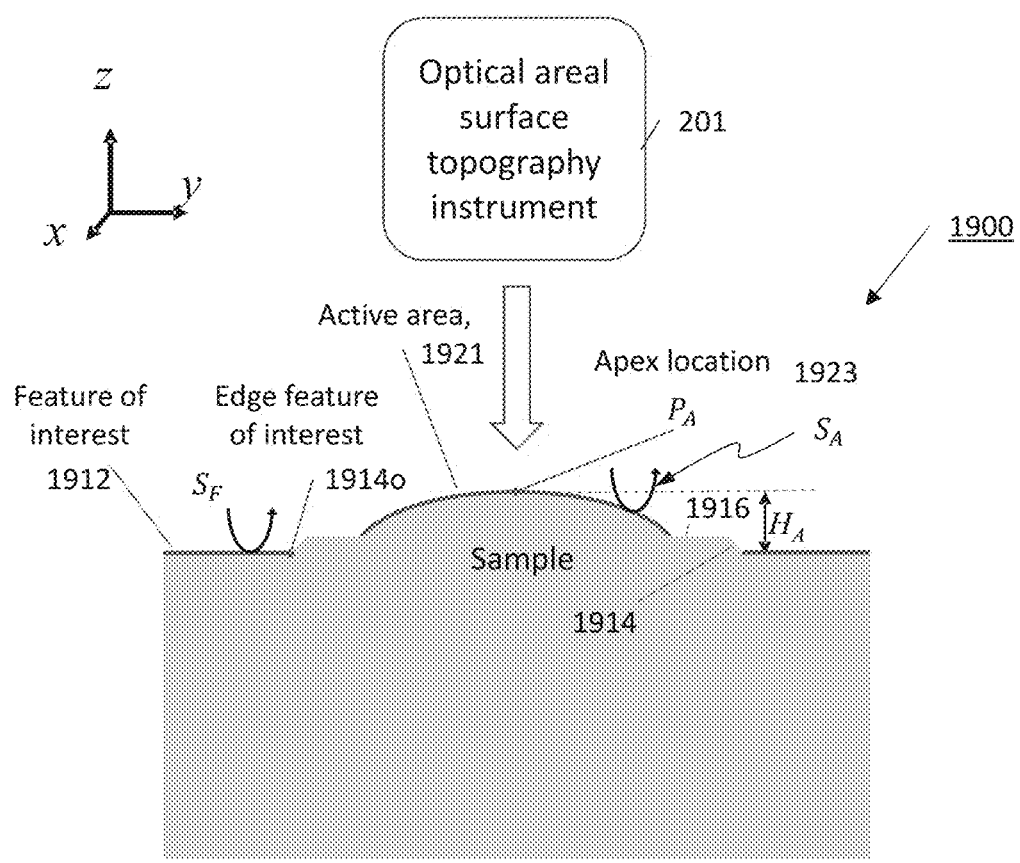
FIG. 19 is a side view of a lens mold under test.

In some embodiments, the foregoing methods may be applied to measuring a mold for the lens. For example, referring to FIG. 19, the sample under test may be a half of a lens mold 1900. This mold includes a curved surface 1921, corresponding to the active area of lenses formed using the mold. Curved surface 1921 has an apex 1923. The mold also includes a planar portion composed of a first, inner planar surface 1916 and a second, outer planar surface 1912. The planar surfaces are separated by a step 1914. The outer edge 1914o of step 1914 may be used as a feature of interest in measurements characterizing mold 1900. Outer, planar surface 1912 and apex 1923 are offset by a height $H_A$ measured along the z-axis of instrument 201. Mold 1900 may be characterized by acquiring height profiles and intensity profiles from, for example, surface 1921 (via light $S_A$) and outer, planar surface 1912 ($S_F$). Information about, e.g., apex location and a lateral offset of the apex to the edge of the feature of interest may be determined as described previously for lens 900.

Figure 20A:
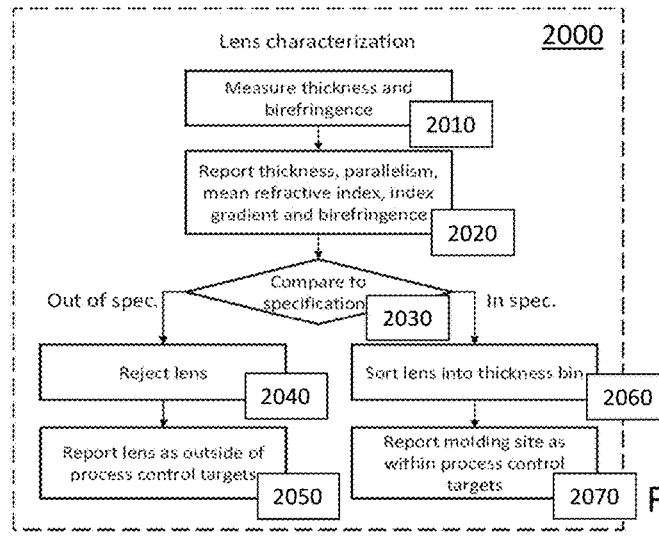
FIG. 20A is a flowchart showing a process flow for the characterization of a lens.
Figure 20B:
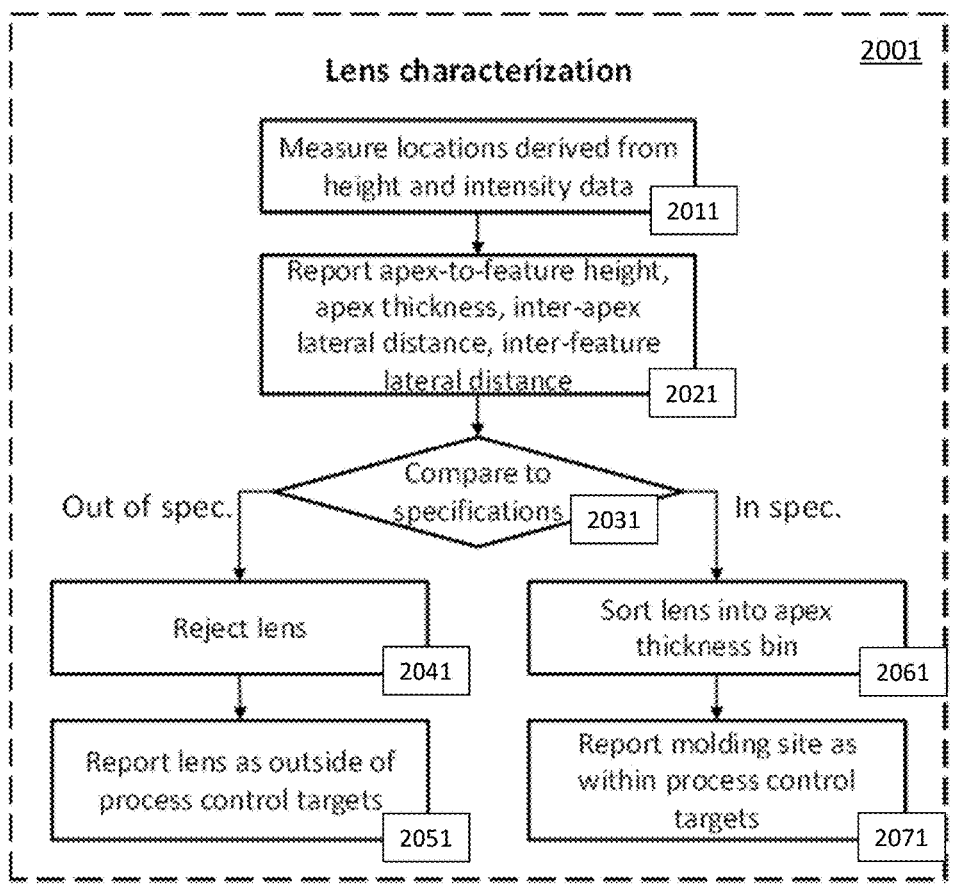
FIG. 20B is a flowchart showing another process flow for the characterization of a lens.

The flowcharts in FIGS. 20A and 20B illustrate possible uses of the described techniques. Flowchart 2000 in FIG. 20A shows a lens characterization technique that uses measurements of thickness and birefringence (step 2010) as described above. In step 2020, based on these measurements, the system reports values for thickness, parallelism, mean refractive index, index gradient, and birefringence. These values are next compared to predetermined specifications for these parameters (step 2030).

For those lenses out of specification, the lenses are rejected (step 2040) and the system reports the corresponding molding sites as being outside process control targets (step 2050). For those lenses that meet specification, the lenses are sorted into thickness bins (step 2060) and the corresponding molding sites are reported as being within process control targets (step 2070).

Flowchart 2001 in FIG. 20B shows a lens characterization technique that uses measurements of apex-to-feature height, apex thickness, inter-apex lateral distance, and inter-feature lateral distance. Here, in a first step 2011, locations of various features on the lens is derived from height and intensity data measured as described above. In step 2021, based on these measurements, the system reports values for apex-to-feature height, apex thickness, inter-apex lateral distance, and inter-feature lateral distance. These values are next compared to predetermined specifications for these parameters (step 2031).

For those lenses out of specification, the lenses are rejected (step 2041) and the system reports the corresponding molding sites as being outside process control targets (step 2051). For those lenses that meet specification, the lenses are sorted into thickness bins (step 2061) and the corresponding molding sites are reported as being within process control targets (step 2071).

The measurement techniques can also be used to characterize the molding process used to make lenses. Implementations for characterizing the molding process are shown in the flow charts in FIGS. 21A and 21B.

Figure 21A:
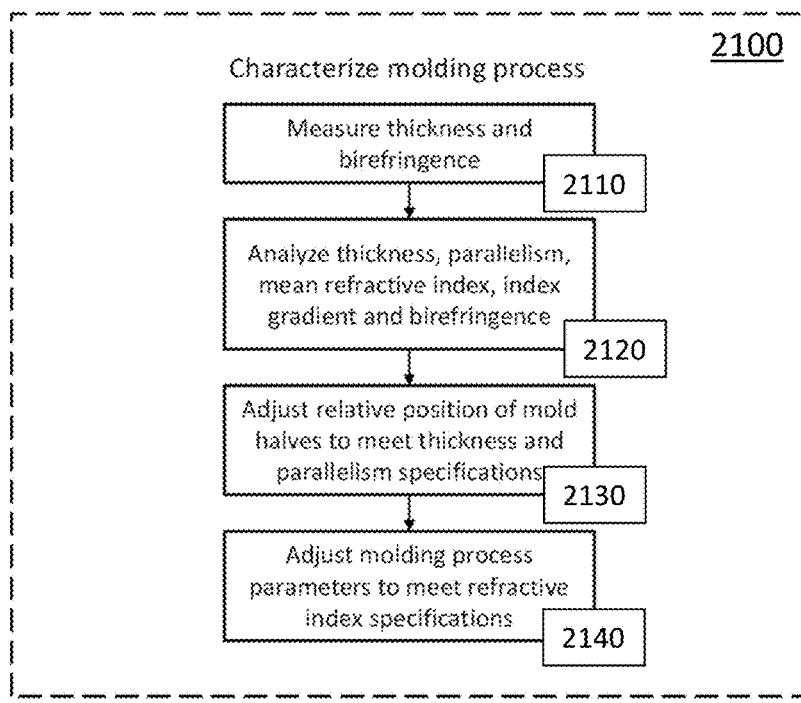
FIGS. 21A and 21B are flowcharts showing process flows for characterizing a lens molding process.

In the process shown in flowchart 2100 in FIG. 21A, the first step 2110 is to measure the thickness and birefringence of the lens's inactive portion. Based on these measurements, the system analyzes thickness, parallelism, mean refractive index, index gradient and birefringence of the lens (step 2120). Based on this analysis, a relative position of the two halves of the mold are adjusted to meet thickness and parallelism specifications (step 2130). Molding process parameters (e.g., temperature and temperature ramp rates, lens material composition, injection pressure) are adjusted in order to meet refractive index specifications (step 2140).

Figure 21B:
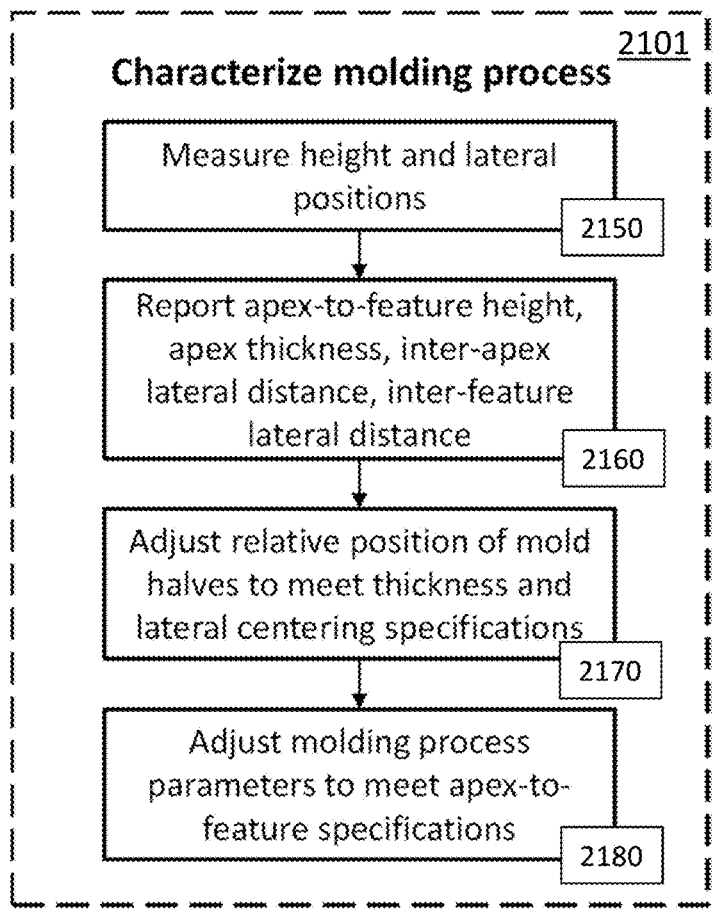

In the process shown in flowchart 2101 in FIG. 21B, the first step 2150 is to measure the height profile of lens surfaces and lateral positions of the apexes and features. Based on these measurements, the system determines and reports apex-to-feature heights, apex thickness, inter-apex lateral distance, and inter-feature lateral distance (step 2160). Based on this analysis, the relative position of the two halves of the mold is adjusted to meet thickness and lateral centering specifications (step 2130). Molding process parameters (e.g., temperature and temperature ramp rates, lens material composition) are adjusted in order to meet apex-to-feature specifications (step 2140).

Although the foregoing flowcharts depict separate processes for birefringence and thickness measurements than for apex and feature measurements, in some embodiments both these sets of measurements may be combined in order to, for example, improve lens characterization and/or lens molding.

Figure 1:
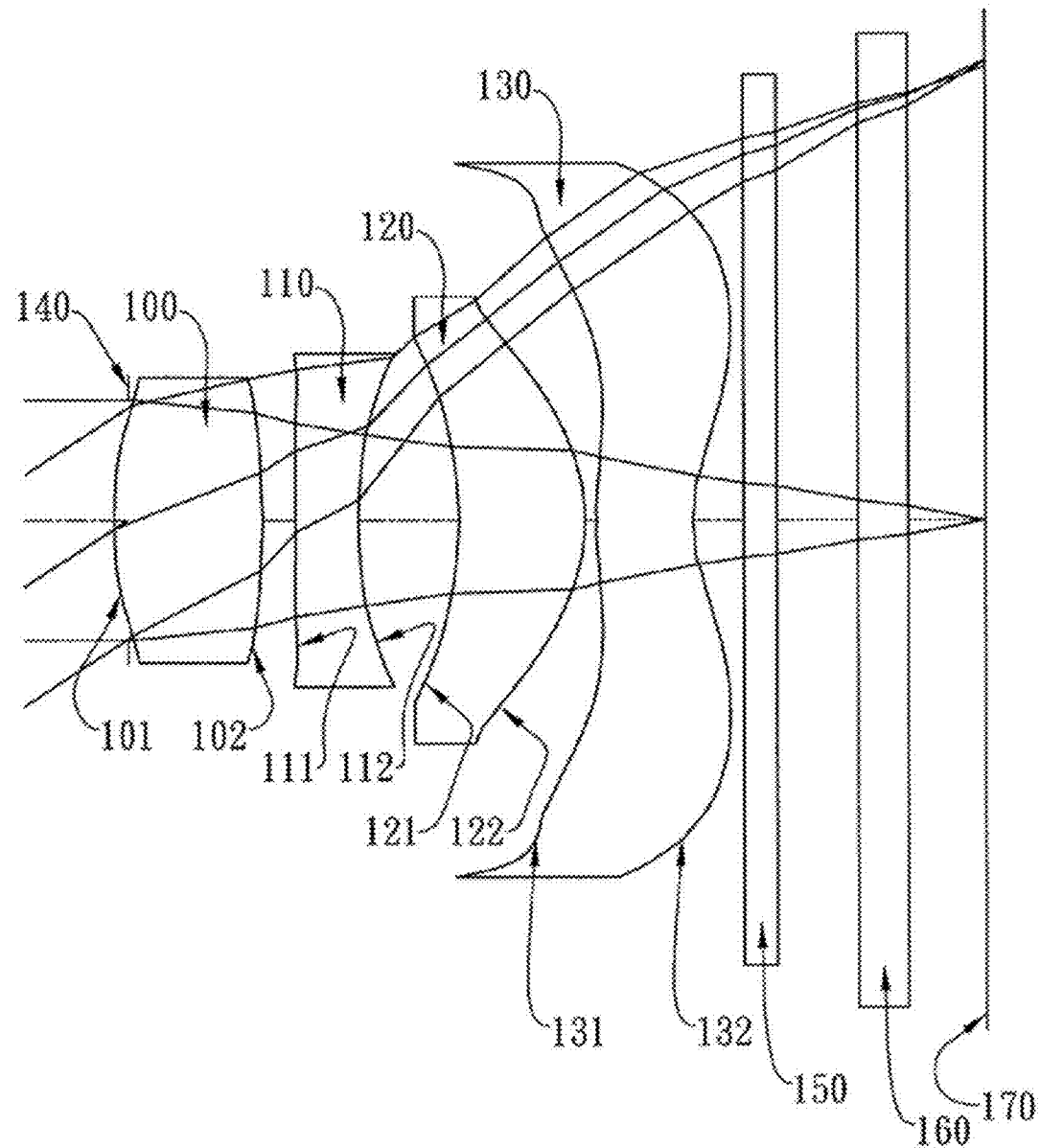
FIG. 1 is a cross-sectional view an imaging optical lens assembly.

While certain implementations have been described, other implementations are also possible. For example, while lens 200 and lens 900 are both meniscus lenses, more generally other types of lenses may be characterized using the disclosed techniques including, for example, convex-convex lenses, concave-concave lenses, plano-convex lenses, and plano-concave lenses. Lens surfaces may be aspherical. In some embodiments, lens surfaces may include points of inflection where the concavity of the surface changes. An example of such a surface is surface 132 in FIG. 1.

Moreover, a variety of alignment features in addition to those illustrated above may be used. For example, while the planar surfaces in lenses 200 and 900 are annular surfaces, other geometries are possible. Discrete features, such as a raised portions on a surface, depressions, or simply marks on a surface, may be used as features in the measurements described above.

While this specification is generally centered on the metrology of optical components, a related class of application is the metrology of the molds that are used to manufacture injection-molded lenses. In this case, a mold exhibits all the features also found on a lens, namely an active optical surface and one or more location, centration or alignment datums. The metrology steps described for one side of a lens are then readily applicable. For instance, the instrument is used to measure the centration and height of the apex of the optical surface with respect to the mechanical datums. Other metrology steps include the characterization of steps between outer datums, as well as the angle of steep conical centration datums.

In certain embodiments, such as where the part under test is larger than the field of view of the optical instrument, measurements of different regions of the part may be stitched together to provide measurements of the entire part. Exemplary techniques for stitching measurements are disclosed in J. Roth and P. de Groot, "Wide-field scanning white light interferometry of rough surfaces," Proc. ASPE Spring Topical Meeting on Advances in Surface Metrology, 57-60 (1997).

In some implementations, additional corrections may be applied to improve measurement accuracy. For example, corrections for the phase change on reflection properties of the surfaces may be applied. See, e.g., in P. de Groot, J. Biegen, J. Clark, X. Colonna de Lega and D. Grigg, "Optical Interferometry for Measurement of the Geometric Dimensions of Industrial Parts," Applied Optics 41(19), 3853-3860 (2002).

In certain implementations, the part may be measured from more than one viewing angle, or from both sides. See, e.g., P. de Groot, J. Biegen, J. Clark, X. Colonna de Lega and D. Grigg, "Optical Interferometry for Measurement of the Geometric Dimensions of Industrial Parts," Applied Optics 41(19), 3853-3860 (2002).

The results of the measurements may be combined with other measurements, including for example stylus measurements of aspheric form, such as disclosed, e.g., in P. Scott, "Recent Developments in the Measurement of Aspheric Surfaces by Contact Stylus Instrumentation," 4927, 199-207 (2002).

A variety of data processing methods may be applied. For instance, methods adapted to measuring multiple surfaces using coherence scanning interferometer may be used. See, e.g., P. J. de Groot and X. Colonna de Lega, "Transparent film profiling and analysis by interference microscopy," Proc. SPIE 7064, 706401-1 706401-6 (2008).

The computations associated with the measurements and analysis described above can be implemented in computer programs using standard programming techniques following the method and figures described herein. Program code is applied to input data to perform the functions described herein and generate output information. The output information may be applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM, optical disc or magnetic disc) readable by a general or special purpose programmable computer, for configuring and operating the computer when the storage media or device is read by the computer to perform the procedures described herein. The computer program can also reside in cache or main memory during program execution. The calibration method can also be implemented, at least in part, as a computer-readable storage medium, configured with a computer program, where the storage medium so configured causes a computer to operate in a specific and predefined manner to perform the functions described herein.

Other embodiments are in the following claims.

What is claimed is:

1. A method for determining information about an object comprising a curved portion and a planar portion, the curved portion comprising a first curved surface having an apex and defining an optical axis of the object, the method comprising:
   directing measurement light to the object;
   detecting measurement light reflected from the first curved surface of the curved portion;
   detecting measurement light reflected from at least one other surface of the object; and determining, based on the detected light from the first curved surface and from the at least one other surface, information about the apex of the first curved surface of the curved portion.

2. The method of claim 1, wherein the object is a transparent optical element.

3. The method of claim 2, wherein the transparent optical element is a lens element.

4. The method of claim 1, wherein the object is portion of a mold for an optical element.

5. The method of claim 1, wherein the curved portion comprises a second curved surface opposite the first curved surface, the second curved surface having an apex, and the information about the apex of the first curved surface comprises a thickness of the object between the apex of the first surface and the apex of the second surface measured along the optical axis.

6. The method of claim 1, wherein the curved portion comprises a second curved surface opposite the first curved surface, the second curved surface having an apex, and the information about the apex of the first curved surface comprises a lateral offset between the apex of the first surface and the apex of the second surface measured in a plane orthogonal to the optical axis.

7. The method of claim 1, wherein the measurement light is directed to the object by an optical instrument and the first curved surface faces the optical instrument when reflecting the measurement light.

8. The method of claim 7, wherein determining the information about the apex of the first curved surface comprises determining a location of the apex.

9. The method of claim 8, wherein the at least one other surface comprises another surface facing the optical instrument and determining the information about the apex of the first curved surface further comprises determining a lateral offset measured in a plane orthogonal to the optical axis between the apex and a feature of interest on the at least one other surface.

10. The method of claim 9, wherein the at least one other surface comprises a surface facing away from the optical instrument and determining the information about the apex of the first curved surface further comprises determining a lateral offset measured in a plane orthogonal to the optical axis between a feature on the surface facing away from the optical instrument and the feature of interest on the other surface facing the optical instrument.

11. The method of claim 10, wherein the curved portion comprises a second curved surface opposite the first curved surface and determining the information about the apex of the first curved surface comprises determining a location of the apex of the second curved surface.

12. The method of claim 11, wherein determining the information about the apex of the first curved surface comprises determining a thickness of the curved portion measured along the optical axis based on the locations of the first and second curved surfaces apexes.

13. The method of claim 11, wherein determining the information about the apex of the first curved surface comprises determining a lateral offset between the apex of the first surface and the apex of the second surface measured in a plane orthogonal to the optical axis based on:
(i) the lateral offset between the apex of the first curved surface and the feature of interest on the other surface facing the optical instrument;
(ii) the lateral offset between the feature of interest on the other surface facing the optical instrument and the feature of interest on the surface facing away from the optical instrument; and
(iii) the lateral offset between the apex of the second curved surface and the feature of interest on the surface facing away from the optical instrument.

14. The method of claim 1, wherein determining information about the apex of the first curved surface comprises determining information about a tilt of at least one surface of the planar portion and accounting for the tilt when determining the information about the apex of the first surface.

15. The method of claim 1, further comprising adjusting an azimuthal orientation of the object with respect to an optical instrument used to direct the measurement light to the object after detecting the measurement light, and repeating the detection of measurement light from the first curved surface and from the at least one other surface after the azimuthal orientation adjustment.

16. The method of claim 1, further comprising changing a polarization state of the measurement light after detecting the measurement light, and repeating the detection of measurement light from the first curved surface and from the at least one other surface after the polarization state change.

17. The method of claim 16, further comprising determining information about a birefringence of the object based on the detected measurement light before and after the polarization state change.

18. A method of forming an optical assembly, comprising:
determining information about the object using the method of claim 1, where the object is a lens; and
securing the lens relative to one or more other lenses in a barrel to form the optical assembly.

19. The method of claim 18, further comprising securing the optical assembly relative to a sensor to provide a module for a digital camera.

20. A system for determining information about an object comprising a curved portion and a planar portion, the curved portion comprising a first curved surface having an apex and defining an optical axis of the object, the system comprising:
a fixture for supporting the object;
an optical instrument comprising a light source, a detector, and optical elements arranged to direct light from the light source towards the object when the object is supported by the fixture and direct light reflected from the object to the detector; and
an electronic controller in communication with the detector, the electronic controller being programmed to determine information about the apex of the first surface based on light detected from the first curved surface and from at least one other surface of the object.

21. The system of claim 20, wherein the optical instrument is an optical areal surface topography instrument.

22. The system of claim 20, wherein the fixture comprises an actuator configured to reorient the object with respect to the optical instrument.

23. The system of claim 20, wherein the optical instrument comprises a polarization module configured to polarize light from the light source.

* * * * *